United States Patent
Kim et al.

(10) Patent No.: US 12,509,673 B2
(45) Date of Patent: Dec. 30, 2025

(54) L-THREONINE DEHYDRATASE VARIANT AND METHOD OF PRODUCING L-ISOLEUCINE USING THE SAME

(71) Applicant: CJ CHEILJEDANG CORPORATION, Seoul (KR)

(72) Inventors: Kyungrim Kim, Seoul (KR); Imsang Lee, Seoul (KR); Heeyeong Kim, Seoul (KR); Kwang Woo Lee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 906 days.

(21) Appl. No.: 17/440,172

(22) PCT Filed: Apr. 21, 2021

(86) PCT No.: PCT/KR2021/005037
§ 371 (c)(1),
(2) Date: Sep. 16, 2021

(87) PCT Pub. No.: WO2021/261733
PCT Pub. Date: Dec. 30, 2021

(65) Prior Publication Data
US 2023/0098971 A1    Mar. 30, 2023

(30) Foreign Application Priority Data
Jun. 26, 2020 (KR) .......... 10-2020-0078669

(51) Int. Cl.
*C12N 15/77* (2006.01)
*C12N 9/88* (2006.01)
*C12P 13/06* (2006.01)

(52) U.S. Cl.
CPC .......... *C12N 9/88* (2013.01); *C12N 15/77* (2013.01); *C12P 13/06* (2013.01); *C12Y 403/01019* (2013.01)

(58) Field of Classification Search
CPC .................................................. C12N 15/77
See application file for complete search history.

(56) References Cited

U.S. PATENT DOCUMENTS 6,107,063 A    8/2000 Moeckel et al.

FOREIGN PATENT DOCUMENTS

| KR | 10-2011-0058731 A | 6/2011 |
| KR | 2017-0047725 A | 5/2017 |
| KR | 10-2018-0134695 A | 12/2018 |

OTHER PUBLICATIONS

Favrot, et al. Biochemistry 2018, 57, pp. 6003-6012 (Year: 2018).*
Favrot et al. NCBI. Genbank accession No. WP_003862033 Multispecies: threonine ammonia-lyase IIvA [Corynebacterium] (May 23, 2020) (Year: 2020).*
Mockel et al. Journal of Bacteriology, Dec. 1992, p. 8065-8072 (Year: 1992).*
Chen et al. Appl Microbiol Biotechnol (2013) 97:2939-2949 (Year: 2013).*
Shulman et al. Biochemistry, vol. 47, No. 45, 2008 (Year: 2008).*
Guo et al. World J Microbiol Biotechnol (2015) 31:1369-1377 (Year: 2015).*
Mockel et al. Molecular Microbiology (1994) 13(5). 833-842 (Year: 1994).*
Friedberg, Brief. Bioinformatics (2006) 7: 225-242 (Year: 2006).*
Thorton et al. Nature structural biology, structural genomics supplement, Nov. 2000, pp. 991-994 (Year: 2000).*
NCBI, Genbank accession No. WP_006284110.1, "threonine ammonia-lyase IIvA [Corynebacterium crenatum]", May 23, 2020, 2 pages.
Guo et al., "Generation of mutant threonine dehydratase and its effects on isoleucine synthesis in *Corynebacterium glutamicum*", World J Microbiol Biotechnol (2015) 31:1369-1377; DOI 10.1007/s11274-015-1885-3.
Peng et al., "Combined dissolved oxygen and pH control strategy to improve the fermentative production of L-isoleucine by Brevibacterium lactofermentum", Bioprocess Biosyst Eng (2010) 33:339-345; DOI 10.1007/s00449-009-0329-6.
S. Guillouet et al., "Metabolic redirection of carbon flow toward isoleucine by expressing a catabolic threonine dehydratase in a threonine-overproducing *Corynebacterium glutamicum*", Appl Microbiol Biotechnol (2001) 57:667-673; DOI 10.1007/s00253-001-0829-z.
Notice of Allowance of Korean application No. 10-2020-0078669 dated Feb. 7, 2022; 4 pages.
NCBI Reference Sequence: WP_003862033.1, "Multispecies: threonine ammonia-lyase IIvA [Corynebacterium]", May 23, 2020.

* cited by examiner

*Primary Examiner* — Melenie L Gordon
*Assistant Examiner* — Jessica Faye Edwards
(74) *Attorney, Agent, or Firm* — Morgan, Lewis & Bockius LLP

(57) ABSTRACT

An L-threonine dehydratase variant is provided that is capable of producing increased yields of the amino acid L-isoleucine when expressed in host organisms and methods of producing increased yields of L-isoleucine using the same.

17 Claims, No Drawings
Specification includes a Sequence Listing.

SEQUENCE LISTING

<160> NUMBER OF SEQ ID NOS: 53

<210> SEQ ID NO 1
<211> LENGTH: 436
<212> TYPE: PRT

<213> ORGANISM: Unknown
<220> FEATURE:
<223> OTHER INFORMATION: ilvA gene

<400> SEQUENCE: 1

```
Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
                20                  25                  30

Ile Ser Ser Val Ile Ala Pro Thr Pro Leu Gln Tyr Cys Pro Arg Leu
            35                  40                  45

Ser Glu Glu Thr Gly Ala Glu Ile Tyr Leu Lys Arg Glu Asp Leu Gln
        50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Val Thr Gly Asn
130                 135                 140

Asn Phe Asp Glu Ala Ser Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
        195                 200                 205

Ala Gly Val Val Ser Tyr Met Ala Asp Met Ala Pro Arg Thr Ala Ile
    210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
        275                 280                 285

Thr Glu Met Leu Asp Leu Tyr Gln Asn Glu Gly Ile Ile Ala Glu Pro
    290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
        355                 360                 365

Phe Leu Glu Asp Ile Leu Gly Pro Asp Asp Ile Thr Leu Phe Glu
    370                 375                 380

Tyr Leu Lys Arg Asn Asn Arg Glu Thr Gly Thr Ala Leu Val Gly Ile
```

```
385                 390                 395                 400
His Leu Ser Glu Ala Ser Gly Leu Asp Ser Leu Leu Glu Arg Met Glu
                405                 410                 415

Glu Ser Ala Ile Asp Ser Arg Arg Leu Glu Pro Gly Thr Pro Glu Tyr
            420                 425                 430

Glu Tyr Leu Thr
        435

<210> SEQ ID NO 2
<211> LENGTH: 1311
<212> TYPE: DNA
<213> ORGANISM: Unknown
<220> FEATURE:
<223> OTHER INFORMATION: ilvA gene

<400> SEQUENCE: 2
atgagtgaaa catacgtgtc tgagaaaagt ccaggagtga tggctagcgg agcggagctg      60
attcgtgccg ccgacattca aacggcgcag gcacgaattt cctccgtcat tgcaccaact     120
ccattgcagt attgccctcg tctttctgag gaaaccggag cggaaatcta ccttaagcgt     180
gaggatctgc aggatgttcg ttcctacaag atccgcggtg cgctgaactc tggagcgcag     240
ctcacccaag agcagcgcga tgcaggtatc gttgccgcat ctgcaggtaa ccatgcccag     300
ggcgtggcct atgtgtgcaa gtccttgggc gttcagggac gcatctatgt tcctgtgcag     360
actccaaagc aaaagcgtga ccgcatcatg gttcacggcg gagagtttgt ctccttggtg     420
gtcactggca ataacttcga cgaagcatcg gctgcagcgc atgaagatgc agagcgcacc     480
ggcgcaacgc tgatcgagcc tttcgatgct cgcaacaccg tcatcggtca gggcaccgtg     540
gctgctgaga tcttgtcgca gctgacttcc atgggcaaga gtgcagatca cgtgatggtt     600
ccagtcggcg gtggcggact tcttgcaggt gtggtcagct acatggctga tatggcacct     660
cgcactgcga tcgttggtat cgaaccagcg ggagcagcat ccatgcaggc tgcattgcac     720
aatggtggac caatcacttt ggagactgtt gatcccttg tggacggcgc agcagtcaaa     780
cgtgtcggag atctcaacta caccatcgtg gagaagaacc agggtcgcgt gcacatgatg     840
agcgcgaccg agggcgctgt gtgtactgag atgctcgatc tttaccaaaa cgaaggcatc     900
atcgcggagc tgctggcgc gctgtctatc gctgggttga aggaaatgtc ctttgcacct     960
ggttctgtcg tggtgtgcat catctctggt ggcaacaacg atgtgctgcg ttatgcggaa    1020
atcgctgagc gctccttggt gcaccgcggt ttgaagcact acttcttggt gaacttcccg    1080
caaaagcctg gtcagttgcg tcacttcctg aagatatcc tgggaccgga tgatgacatc    1140
acgctgtttg agtacctcaa gcgcaacaac cgtgagaccg gtactgcgtt ggtgggtatt    1200
cacttgagtg aagcatcagg attggattct ttgctggaac gtatggagga atcggcaatt    1260
gattcccgtc gcctcgagcc gggcaccect gagtacgaat acttgaccta a              1311

<210> SEQ ID NO 3
<211> LENGTH: 436
<212> TYPE: PRT
<213> ORGANISM: Artificial Sequence
<220> FEATURE:
<223> OTHER INFORMATION: Synthetic:  ilvA(T381A)

<400> SEQUENCE: 3

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
```

-continued

```
                20                  25                  30
Ile Ser Ser Val Ile Ala Pro Thr Pro Leu Gln Tyr Cys Pro Arg Leu
            35                  40                  45
Ser Glu Glu Thr Gly Ala Glu Ile Tyr Leu Lys Arg Glu Asp Leu Gln
        50                  55                  60
Asp Val Arg Ser Tyr Lys Ile Arg Gly Ala Leu Asn Ser Gly Ala Gln
65                  70                  75                  80
Leu Thr Gln Glu Gln Arg Asp Ala Gly Ile Val Ala Ala Ser Ala Gly
                85                  90                  95
Asn His Ala Gln Gly Val Ala Tyr Val Cys Lys Ser Leu Gly Val Gln
            100                 105                 110
Gly Arg Ile Tyr Val Pro Val Gln Thr Pro Lys Gln Lys Arg Asp Arg
        115                 120                 125
Ile Met Val His Gly Gly Glu Phe Val Ser Leu Val Val Thr Gly Asn
        130                 135                 140
Asn Phe Asp Glu Ala Ser Ala Ala Ala His Glu Asp Ala Glu Arg Thr
145                 150                 155                 160
Gly Ala Thr Leu Ile Glu Pro Phe Asp Ala Arg Asn Thr Val Ile Gly
                165                 170                 175
Gln Gly Thr Val Ala Ala Glu Ile Leu Ser Gln Leu Thr Ser Met Gly
            180                 185                 190
Lys Ser Ala Asp His Val Met Val Pro Val Gly Gly Gly Gly Leu Leu
        195                 200                 205
Ala Gly Val Val Ser Tyr Met Ala Asp Met Ala Pro Arg Thr Ala Ile
        210                 215                 220
Val Gly Ile Glu Pro Ala Gly Ala Ala Ser Met Gln Ala Ala Leu His
225                 230                 235                 240
Asn Gly Gly Pro Ile Thr Leu Glu Thr Val Asp Pro Phe Val Asp Gly
                245                 250                 255
Ala Ala Val Lys Arg Val Gly Asp Leu Asn Tyr Thr Ile Val Glu Lys
            260                 265                 270
Asn Gln Gly Arg Val His Met Met Ser Ala Thr Glu Gly Ala Val Cys
        275                 280                 285
Thr Glu Met Leu Asp Leu Tyr Gln Asn Glu Gly Ile Ile Ala Glu Pro
        290                 295                 300
Ala Gly Ala Leu Ser Ile Ala Gly Leu Lys Glu Met Ser Phe Ala Pro
305                 310                 315                 320
Gly Ser Val Val Val Cys Ile Ile Ser Gly Gly Asn Asn Asp Val Leu
                325                 330                 335
Arg Tyr Ala Glu Ile Ala Glu Arg Ser Leu Val His Arg Gly Leu Lys
            340                 345                 350
His Tyr Phe Leu Val Asn Phe Pro Gln Lys Pro Gly Gln Leu Arg His
        355                 360                 365
Phe Leu Glu Asp Ile Leu Gly Pro Asp Asp Ile Ala Leu Phe Glu
        370                 375                 380
Tyr Leu Lys Arg Asn Asn Arg Glu Thr Gly Thr Ala Leu Val Gly Ile
385                 390                 395                 400
His Leu Ser Glu Ala Ser Gly Leu Asp Ser Leu Leu Glu Arg Met Glu
                405                 410                 415
Glu Ser Ala Ile Asp Ser Arg Arg Leu Glu Pro Gly Thr Pro Glu Tyr
            420                 425                 430
Glu Tyr Leu Thr
        435
```

-continued

<210> SEQ ID NO 4
<211> LENGTH: 436
<212> TYPE: PRT
<213> ORGANISM: Artificial Sequence
<220> FEATURE:
<223> OTHER INFORMATION: Synthetic: ilvA(T381S)

<400> SEQUENCE: 4

```
Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Val Thr Gly Asn
    130                 135                 140

Asn Phe Asp Glu Ala Ser Ala Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
        195                 200                 205

Ala Gly Val Val Ser Tyr Met Ala Asp Met Ala Pro Arg Thr Ala Ile
    210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
        275                 280                 285

Thr Glu Met Leu Asp Leu Tyr Gln Asn Glu Gly Ile Ile Ala Glu Pro
    290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
        355                 360                 365
```

```
Phe Leu Glu Asp Ile Leu Gly Pro Asp Asp Ile Ser Leu Phe Glu
        370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Gly Arg Met Glu
                405                 410                 415

Glu Ser Ala Ile Asp Ser Arg Arg Leu Glu Pro Gly Thr Pro Glu Tyr
            420                 425                 430

Glu Tyr Leu Thr
            435

<210> SEQ ID NO 5
<211> LENGTH: 436
<212> TYPE: PRT
<213> ORGANISM: Artificial Sequence
<220> FEATURE:
<223> OTHER INFORMATION: Synthetic: ilvA(T381P)

<400> SEQUENCE: 5

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Val Thr Gly Asn
130                 135                 140

Asn Phe Asp Glu Ala Ser Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
        195                 200                 205

Ala Gly Val Val Ser Tyr Met Ala Asp Met Ala Pro Arg Thr Ala Ile
    210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
        275                 280                 285
```

-continued

```
Thr Glu Met Leu Asp Leu Tyr Gln Asn Glu Gly Ile Ile Ala Glu Pro
        290                 295                 300
Ala Gly Ala Leu Ser Ile Ala Gly Leu Lys Glu Met Ser Phe Ala Pro
305                 310                 315                 320
Gly Ser Val Val Val Cys Ile Ile Ser Gly Gly Asn Asn Asp Val Leu
                    325                 330                 335
Arg Tyr Ala Glu Ile Ala Glu Arg Ser Leu Val His Arg Gly Leu Lys
                340                 345                 350
His Tyr Phe Leu Val Asn Phe Pro Gln Lys Pro Gly Gln Leu Arg His
            355                 360                 365
Phe Leu Glu Asp Ile Leu Gly Pro Asp Asp Ile Pro Leu Phe Glu
        370                 375                 380
Tyr Leu Lys Arg Asn Asn Arg Glu Thr Gly Thr Ala Leu Val Gly Ile
385                 390                 395                 400
His Leu Ser Glu Ala Ser Gly Leu Asp Ser Leu Leu Glu Arg Met Glu
                405                 410                 415
Glu Ser Ala Ile Asp Ser Arg Arg Leu Glu Pro Gly Thr Pro Glu Tyr
                420                 425                 430
Glu Tyr Leu Thr
            435

<210> SEQ ID NO 6
<211> LENGTH: 436
<212> TYPE: PRT
<213> ORGANISM: Artificial Sequence
<220> FEATURE:
<223> OTHER INFORMATION: Synthetic:   ilvA(T381Q)

<400> SEQUENCE: 6

Met Ser Glu Thr Tyr Val Ser Glu Lys Ser Pro Gly Val Met Ala Ser
1               5                   10                  15
Gly Ala Glu Leu Ile Arg Ala Ala Asp Ile Gln Thr Ala Gln Ala Arg
            20                  25                  30
Ile Ser Ser Val Ile Ala Pro Thr Pro Leu Gln Tyr Cys Pro Arg Leu
        35                  40                  45
Ser Glu Glu Thr Gly Ala Glu Ile Tyr Leu Lys Arg Glu Asp Leu Gln
    50                  55                  60
Asp Val Arg Ser Tyr Lys Ile Arg Gly Ala Leu Asn Ser Gly Ala Gln
65                  70                  75                  80
Leu Thr Gln Glu Gln Arg Asp Ala Gly Ile Val Ala Ala Ser Ala Gly
                85                  90                  95
Asn His Ala Gln Gly Val Ala Tyr Val Cys Lys Ser Leu Gly Val Gln
            100                 105                 110
Gly Arg Ile Tyr Val Pro Val Gln Thr Pro Lys Gln Lys Arg Asp Arg
        115                 120                 125
Ile Met Val His Gly Gly Glu Phe Val Ser Leu Val Val Thr Gly Asn
    130                 135                 140
Asn Phe Asp Glu Ala Ser Ala Ala His Glu Asp Ala Glu Arg Thr
145                 150                 155                 160
Gly Ala Thr Leu Ile Glu Pro Phe Asp Ala Arg Asn Thr Val Ile Gly
                165                 170                 175
Gln Gly Thr Val Ala Ala Glu Ile Leu Ser Gln Leu Thr Ser Met Gly
            180                 185                 190
Lys Ser Ala Asp His Val Met Val Pro Val Gly Gly Gly Gly Leu Leu
        195                 200                 205
```

Ala Gly Val Val Ser Tyr Met Ala Asp Met Ala Pro Arg Thr Ala Ile
    210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
        275                 280                 285

Thr Glu Met Leu Asp Leu Tyr Gln Asn Glu Gly Ile Ile Ala Glu Pro
    290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
        355                 360                 365

Phe Leu Glu Asp Ile Leu Gly Pro Asp Asp Ile Gln Leu Phe Glu
    370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
                405                 410                 415

Glu Ser Ala Ile Asp Ser Arg Arg Leu Glu Pro Gly Thr Pro Glu Tyr
            420                 425                 430

Glu Tyr Leu Thr
        435

<210> SEQ ID NO 7
<211> LENGTH: 436
<212> TYPE: PRT
<213> ORGANISM: Artificial Sequence
<220> FEATURE:
<223> OTHER INFORMATION: Synthetic: ilvA(T381V)

<400> SEQUENCE: 7

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Thr Gly Asn
            130                 135                 140

Asn Phe Asp Glu Ala Ser Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
            195                 200                 205

Ala Gly Val Val Ser Tyr Met Ala Asp Met Ala Pro Arg Thr Ala Ile
            210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
            275                 280                 285

Thr Glu Met Leu Asp Leu Tyr Gln Asn Glu Gly Ile Ile Ala Glu Pro
290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
            355                 360                 365

Phe Leu Glu Asp Ile Leu Gly Pro Asp Asp Ile Val Leu Phe Glu
370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
            405                 410                 415

Glu Ser Ala Ile Asp Ser Arg Arg Leu Glu Pro Gly Thr Pro Glu Tyr
            420                 425                 430

Glu Tyr Leu Thr
            435

<210> SEQ ID NO 8
<211> LENGTH: 436
<212> TYPE: PRT
<213> ORGANISM: Artificial Sequence
<220> FEATURE:
<223> OTHER INFORMATION: Synthetic: ilvA(T381I)

<400> SEQUENCE: 8

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

```
Ser Glu Glu Thr Gly Ala Glu Ile Tyr Leu Lys Arg Glu Asp Leu Gln
     50                  55                  60

Asp Val Arg Ser Tyr Lys Ile Arg Gly Ala Leu Asn Ser Gly Ala Gln
 65                  70                  75                  80

Leu Thr Gln Glu Gln Arg Asp Ala Gly Ile Val Ala Ala Ser Ala Gly
                 85                  90                  95

Asn His Ala Gln Gly Val Ala Tyr Val Cys Lys Ser Leu Gly Val Gln
                100                 105                 110

Gly Arg Ile Tyr Val Pro Val Gln Thr Pro Lys Gln Lys Arg Asp Arg
             115                 120                 125

Ile Met Val His Gly Gly Glu Phe Val Ser Leu Val Val Thr Gly Asn
     130                 135                 140

Asn Phe Asp Glu Ala Ser Ala Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
     195                 200                 205

Ala Gly Val Val Ser Tyr Met Ala Asp Met Ala Pro Arg Thr Ala Ile
     210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
     275                 280                 285

Thr Glu Met Leu Asp Leu Tyr Gln Asn Glu Gly Ile Ile Ala Glu Pro
     290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
     355                 360                 365

Phe Leu Glu Asp Ile Leu Gly Pro Asp Asp Ile Ile Leu Phe Glu
     370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
                405                 410                 415

Glu Ser Ala Ile Asp Ser Arg Arg Leu Glu Pro Gly Thr Pro Glu Tyr
            420                 425                 430

Glu Tyr Leu Thr
         435

<210> SEQ ID NO 9
<211> LENGTH: 436
```

```
<212> TYPE: PRT
<213> ORGANISM: Artificial Sequence
<220> FEATURE:
<223> OTHER INFORMATION: Synthetic:  ilvA(T381G)

<400> SEQUENCE: 9
```

| | | | | | | | | | | | | | | |
|---|---|---|---|---|---|---|---|---|---|---|---|---|---|---|
| Met | Ser | Glu | Thr | Tyr | Val | Ser | Glu | Lys | Ser | Pro | Gly | Val | Met | Ala | Ser |
| 1 | | | | 5 | | | | | 10 | | | | | 15 |

| | | | | | | | | | | | | | | |
|---|---|---|---|---|---|---|---|---|---|---|---|---|---|---|
| Gly | Ala | Glu | Leu | Ile | Arg | Ala | Ala | Asp | Ile | Gln | Thr | Ala | Gln | Ala | Arg |
| | | | 20 | | | | | 25 | | | | | 30 |

| | | | | | | | | | | | | | | |
|---|---|---|---|---|---|---|---|---|---|---|---|---|---|---|
| Ile | Ser | Ser | Val | Ile | Ala | Pro | Thr | Pro | Leu | Gln | Tyr | Cys | Pro | Arg | Leu |
| | | 35 | | | | | 40 | | | | | 45 |

| | | | | | | | | | | | | | | |
|---|---|---|---|---|---|---|---|---|---|---|---|---|---|---|
| Ser | Glu | Glu | Thr | Gly | Ala | Glu | Ile | Tyr | Leu | Lys | Arg | Glu | Asp | Leu | Gln |
| | 50 | | | | | 55 | | | | | 60 |

| | | | | | | | | | | | | | | |
|---|---|---|---|---|---|---|---|---|---|---|---|---|---|---|
| Asp | Val | Arg | Ser | Tyr | Lys | Ile | Arg | Gly | Ala | Leu | Asn | Ser | Gly | Ala | Gln |
| 65 | | | | | 70 | | | | | 75 | | | | | 80 |

| | | | | | | | | | | | | | | |
|---|---|---|---|---|---|---|---|---|---|---|---|---|---|---|
| Leu | Thr | Gln | Glu | Gln | Arg | Asp | Ala | Gly | Ile | Val | Ala | Ala | Ser | Ala | Gly |
| | | | | 85 | | | | | 90 | | | | | 95 |

| | | | | | | | | | | | | | | |
|---|---|---|---|---|---|---|---|---|---|---|---|---|---|---|
| Asn | His | Ala | Gln | Gly | Val | Ala | Tyr | Val | Cys | Lys | Ser | Leu | Gly | Val | Gln |
| | | | 100 | | | | | 105 | | | | | 110 |

| | | | | | | | | | | | | | | |
|---|---|---|---|---|---|---|---|---|---|---|---|---|---|---|
| Gly | Arg | Ile | Tyr | Val | Pro | Val | Gln | Thr | Pro | Lys | Gln | Lys | Arg | Asp | Arg |
| | | 115 | | | | | 120 | | | | | 125 |

| | | | | | | | | | | | | | | |
|---|---|---|---|---|---|---|---|---|---|---|---|---|---|---|
| Ile | Met | Val | His | Gly | Gly | Glu | Phe | Val | Ser | Leu | Val | Val | Thr | Gly | Asn |
| 130 | | | | | 135 | | | | | 140 |

| | | | | | | | | | | | | | | |
|---|---|---|---|---|---|---|---|---|---|---|---|---|---|---|
| Asn | Phe | Asp | Glu | Ala | Ser | Ala | Ala | Ala | His | Glu | Asp | Ala | Glu | Arg | Thr |
| 145 | | | | | 150 | | | | | 155 | | | | | 160 |

| | | | | | | | | | | | | | | |
|---|---|---|---|---|---|---|---|---|---|---|---|---|---|---|
| Gly | Ala | Thr | Leu | Ile | Glu | Pro | Phe | Asp | Ala | Arg | Asn | Thr | Val | Ile | Gly |
| | | | | 165 | | | | | 170 | | | | | 175 |

| | | | | | | | | | | | | | | |
|---|---|---|---|---|---|---|---|---|---|---|---|---|---|---|
| Gln | Gly | Thr | Val | Ala | Ala | Glu | Ile | Leu | Ser | Gln | Leu | Thr | Ser | Met | Gly |
| | | | 180 | | | | | 185 | | | | | 190 |

| | | | | | | | | | | | | | | |
|---|---|---|---|---|---|---|---|---|---|---|---|---|---|---|
| Lys | Ser | Ala | Asp | His | Val | Met | Val | Pro | Val | Gly | Gly | Gly | Gly | Leu | Leu |
| | | 195 | | | | | 200 | | | | | 205 |

| | | | | | | | | | | | | | | |
|---|---|---|---|---|---|---|---|---|---|---|---|---|---|---|
| Ala | Gly | Val | Val | Ser | Tyr | Met | Ala | Asp | Met | Ala | Pro | Arg | Thr | Ala | Ile |
| 210 | | | | | 215 | | | | | 220 |

| | | | | | | | | | | | | | | |
|---|---|---|---|---|---|---|---|---|---|---|---|---|---|---|
| Val | Gly | Ile | Glu | Pro | Ala | Gly | Ala | Ala | Ser | Met | Gln | Ala | Ala | Leu | His |
| 225 | | | | | 230 | | | | | 235 | | | | | 240 |

| | | | | | | | | | | | | | | |
|---|---|---|---|---|---|---|---|---|---|---|---|---|---|---|
| Asn | Gly | Gly | Pro | Ile | Thr | Leu | Glu | Thr | Val | Asp | Pro | Phe | Val | Asp | Gly |
| | | | | 245 | | | | | 250 | | | | | 255 |

| | | | | | | | | | | | | | | |
|---|---|---|---|---|---|---|---|---|---|---|---|---|---|---|
| Ala | Ala | Val | Lys | Arg | Val | Gly | Asp | Leu | Asn | Tyr | Thr | Ile | Val | Glu | Lys |
| | | | 260 | | | | | 265 | | | | | 270 |

| | | | | | | | | | | | | | | |
|---|---|---|---|---|---|---|---|---|---|---|---|---|---|---|
| Asn | Gln | Gly | Arg | Val | His | Met | Met | Ser | Ala | Thr | Glu | Gly | Ala | Val | Cys |
| | | 275 | | | | | 280 | | | | | 285 |

| | | | | | | | | | | | | | | |
|---|---|---|---|---|---|---|---|---|---|---|---|---|---|---|
| Thr | Glu | Met | Leu | Asp | Leu | Tyr | Gln | Asn | Glu | Gly | Ile | Ile | Ala | Glu | Pro |
| | 290 | | | | | 295 | | | | | 300 |

| | | | | | | | | | | | | | | |
|---|---|---|---|---|---|---|---|---|---|---|---|---|---|---|
| Ala | Gly | Ala | Leu | Ser | Ile | Ala | Gly | Leu | Lys | Glu | Met | Ser | Phe | Ala | Pro |
| 305 | | | | | 310 | | | | | 315 | | | | | 320 |

| | | | | | | | | | | | | | | |
|---|---|---|---|---|---|---|---|---|---|---|---|---|---|---|
| Gly | Ser | Val | Val | Val | Cys | Ile | Ile | Ser | Gly | Gly | Asn | Asn | Asp | Val | Leu |
| | | | | 325 | | | | | 330 | | | | | 335 |

| | | | | | | | | | | | | | | |
|---|---|---|---|---|---|---|---|---|---|---|---|---|---|---|
| Arg | Tyr | Ala | Glu | Ile | Ala | Glu | Arg | Ser | Leu | Val | His | Arg | Gly | Leu | Lys |
| | | | 340 | | | | | 345 | | | | | 350 |

| | | | | | | | | | | | | | | |
|---|---|---|---|---|---|---|---|---|---|---|---|---|---|---|
| His | Tyr | Phe | Leu | Val | Asn | Phe | Pro | Gln | Lys | Pro | Gly | Gln | Leu | Arg | His |
| | | 355 | | | | | 360 | | | | | 365 |

| | | | | | | | | | | | | |
|---|---|---|---|---|---|---|---|---|---|---|---|---|
| Phe | Leu | Glu | Asp | Ile | Leu | Gly | Pro | Asp | Asp | Ile | Gly | Leu | Phe | Glu |
| | 370 | | | | | 375 | | | | | 380 |

```
Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
            405                 410                 415

Glu Ser Ala Ile Asp Ser Arg Arg Leu Glu Pro Gly Thr Pro Glu Tyr
            420                 425                 430

Glu Tyr Leu Thr
        435

<210> SEQ ID NO 10
<211> LENGTH: 436
<212> TYPE: PRT
<213> ORGANISM: Artificial Sequence
<220> FEATURE:
<223> OTHER INFORMATION: Synthetic:  ilvA(T381M)

<400> SEQUENCE: 10

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Val Thr Gly Asn
130                 135                 140

Asn Phe Asp Glu Ala Ser Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Leu Leu
        195                 200                 205

Ala Gly Val Val Ser Tyr Met Ala Asp Met Ala Pro Arg Thr Ala Ile
210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
        275                 280                 285

Thr Glu Met Leu Asp Leu Tyr Gln Asn Glu Gly Ile Ile Ala Glu Pro
    290                 295                 300
```

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
            325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
            355                 360                 365

Phe Leu Glu Asp Ile Leu Gly Pro Asp Asp Ile Met Leu Phe Glu
370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
            405                 410                 415

Glu Ser Ala Ile Asp Ser Arg Arg Leu Glu Pro Gly Thr Pro Glu Tyr
            420                 425                 430

Glu Tyr Leu Thr
        435

<210> SEQ ID NO 11
<211> LENGTH: 26
<212> TYPE: DNA
<213> ORGANISM: Artificial Sequence
<220> FEATURE:
<223> OTHER INFORMATION: Synthetic: primer1

<400> SEQUENCE: 11
ggatccgact gagcctgggc aactgg                                            26

<210> SEQ ID NO 12
<211> LENGTH: 26
<212> TYPE: DNA
<213> ORGANISM: Artificial Sequence
<220> FEATURE:
<223> OTHER INFORMATION: Synthetic: primer2

<400> SEQUENCE: 12
ggatccccgt caccgacacc tccaca                                            26

<210> SEQ ID NO 13
<211> LENGTH: 25
<212> TYPE: DNA
<213> ORGANISM: Artificial Sequence
<220> FEATURE:
<223> OTHER INFORMATION: Synthetic: primer3

<400> SEQUENCE: 13
acatcacgct ggcagagtac ctcaa                                             25

<210> SEQ ID NO 14
<211> LENGTH: 25
<212> TYPE: DNA
<213> ORGANISM: Artificial Sequence
<220> FEATURE:
<223> OTHER INFORMATION: Synthetic: primer4

<400> SEQUENCE: 14
ttgaggtact ctgccagcgt gatgt                                             25

<210> SEQ ID NO 15
<211> LENGTH: 1311
<212> TYPE: DNA

<213> ORGANISM: Artificial Sequence
<220> FEATURE:
<223> OTHER INFORMATION: Synthetic: ilvA(F383A)

<400> SEQUENCE: 15

```
atgagtgaaa catacgtgtc tgagaaaagt ccaggagtga tggctagcgg agcggagctg      60
attcgtgccg ccgacattca acggcgcag gcacgaattt cctccgtcat tgcaccaact      120
ccattgcagt attgccctcg tctttctgag gaaaccggag cggaaatcta ccttaagcgt     180
gaggatctgc aggatgttcg ttcctacaag atccgcggtg cgctgaactc tggagcgcag     240
ctcactcagg agcagcgcga tgcaggtatc gttgccgcat ctgcaggtaa ccatgcccag     300
ggcgtggcct atgtgtgcaa gtccttgggc gttcagggac gcatctatgt tcctgtgcag     360
actccaaagc aaaagcgtga ccgcatcatg gttcacggcg agagtttgt ctccttggtg      420
gtcactggca ataacttcga cgaagcatcg gctgcagcgc atgaagatgc agagcgcacc     480
ggcgcaacgc tgatcgagcc tttcgatgct cgcaacaccg tcatcggtca gggtacagtg     540
gctgctgaga tcttgtcgca gctgacttcc atgggcaaga gtgcagatca cgtgatggtt     600
ccagtcggcg gtggcggact tcttgcaggt gtggtcagct acatggctga tatggcacct     660
cgcactgcga tcgttggtat cgaaccagcg ggagcagcat ccatgcaggc tgcattgcac     720
aatggtggac caatcacttt ggagactgtt gatccctttg tggacggcgc agcagtcaaa     780
cgtgtcggag atctcaacta caccatcgtg agaagaacc agggtcgcgt gcacatgatg     840
agcgcgaccg agggcgctgt gtgtactgag atgctcgatc tttaccaaaa cgaaggcatc     900
atcgcggagc tgctggcgc gctgtctatc gctgggttga aggaaatgtc ctttgcacct     960
ggttctgtcg tggtgtgcat catctctggt ggcaacaacg atgtgctgcg ttatgcggaa    1020
atcgctgagc gctccttggt gcaccgcggt ttgaagcact acttcttggt gaacttcccg    1080
caaaagcctg gtcagttgcg tcacttcctg gaagatatcc tgggaccgga tgatgacatc    1140
acgctggcag agtacctcaa gcgcaacaac cgtgagaccg gtactgcgtt ggtgggtatt    1200
cacttgagtg aagcatcagg attggattct ttgctggaac gtatggagga atcggcaatt    1260
gattcccgtc gcctcgagcc gggcaccccct gagtacgaat acttgaccta a            1311
```

<210> SEQ ID NO 16
<211> LENGTH: 436
<212> TYPE: PRT
<213> ORGANISM: Artificial Sequence
<220> FEATURE:
<223> OTHER INFORMATION: Synthetic: ilvA(F383A)

<400> SEQUENCE: 16

```
Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
```

```
                100                 105                 110
Gly Arg Ile Tyr Val Pro Val Gln Thr Pro Lys Gln Lys Arg Asp Arg
            115                 120                 125
Ile Met Val His Gly Gly Glu Phe Val Ser Leu Val Thr Gly Asn
        130                 135                 140
Asn Phe Asp Glu Ala Ser Ala Ala His Glu Asp Ala Glu Arg Thr
145                 150                 155                 160
Gly Ala Thr Leu Ile Glu Pro Phe Asp Ala Arg Asn Thr Val Ile Gly
                165                 170                 175
Gln Gly Thr Val Ala Ala Glu Ile Leu Ser Gln Leu Thr Ser Met Gly
            180                 185                 190
Lys Ser Ala Asp His Val Met Val Pro Val Gly Gly Gly Gly Leu Leu
        195                 200                 205
Ala Gly Val Val Ser Tyr Met Ala Asp Met Ala Pro Arg Thr Ala Ile
        210                 215                 220
Val Gly Ile Glu Pro Ala Gly Ala Ala Ser Met Gln Ala Ala Leu His
225                 230                 235                 240
Asn Gly Gly Pro Ile Thr Leu Glu Thr Val Asp Pro Phe Val Asp Gly
                245                 250                 255
Ala Ala Val Lys Arg Val Gly Asp Leu Asn Tyr Thr Ile Val Glu Lys
            260                 265                 270
Asn Gln Gly Arg Val His Met Met Ser Ala Thr Glu Gly Ala Val Cys
        275                 280                 285
Thr Glu Met Leu Asp Leu Tyr Gln Asn Glu Gly Ile Ile Ala Glu Pro
    290                 295                 300
Ala Gly Ala Leu Ser Ile Ala Gly Leu Lys Glu Met Ser Phe Ala Pro
305                 310                 315                 320
Gly Ser Val Val Val Cys Ile Ile Ser Gly Gly Asn Asn Asp Val Leu
                325                 330                 335
Arg Tyr Ala Glu Ile Ala Glu Arg Ser Leu Val His Arg Gly Leu Lys
            340                 345                 350
His Tyr Phe Leu Val Asn Phe Pro Gln Lys Pro Gly Gln Leu Arg His
        355                 360                 365
Phe Leu Glu Asp Ile Leu Gly Pro Asp Asp Ile Thr Leu Ala Glu
    370                 375                 380
Tyr Leu Lys Arg Asn Asn Arg Glu Thr Gly Thr Ala Leu Val Gly Ile
385                 390                 395                 400
His Leu Ser Glu Ala Ser Gly Leu Asp Ser Leu Leu Glu Arg Met Glu
                405                 410                 415
Glu Ser Ala Ile Asp Ser Arg Arg Leu Glu Pro Gly Thr Pro Glu Tyr
            420                 425                 430
Glu Tyr Leu Thr
        435

<210> SEQ ID NO 17
<211> LENGTH: 1338
<212> TYPE: DNA
<213> ORGANISM: Artificial Sequence
<220> FEATURE:
<223> OTHER INFORMATION: Synthetic: hom(R407H)

<400> SEQUENCE: 17
atgacctcag catctgcccc aagctttaac cccggcaagg gtccggctc agcagtcgga    60 attgcccttt taggattcgg aacagtcggc actgaggtga tgcgtctgat gaccgagtac   120
```

```
ggtgatgaac ttgcgcaccg cattggtggc ccactggagg ttcgtggcat tgctgtttct      180
gatatctcaa agccacgtga aggcgttgca cctgagctgc tcactgagga cgcttttgca      240
ctcatcgagc gcgaggatgt tgacatcgtc gttgaggtta tcggcggcat tgagtaccca      300
cgtgaggtag ttctcgcagc tctgaaggcc ggcaagtctg ttgttaccgc caataaggct      360
cttgttgcag ctcactctgc tgagcttgct gatgcagcgg aagccgcaaa cgttgacctg      420
tacttcgagg ctgctgttgc aggcgcaatt ccagtggttg gcccactgcg tcgctccctg      480
gctggcgatc agatccagtc tgtgatgggc atcgttaacg gcaccaccaa cttcatcttg      540
gacgccatgg attccaccgg cgctgactat gcagattctt tggctgaggc aactcgtttg      600
ggttacgccg aagctgatcc aactgcagac gtcgaaggcc atgacgccgc atccaaggct      660
gcaattttgg catccatcgc tttccacacc cgtgttaccg cggatgatgt gtactgcgaa      720
ggtatcagca acatcagcgc tgccgacatt gaggcagcac agcaggcagg ccacaccatc      780
aagttgttgg ccatctgtga aagttcacc aacaaggaag aaagtcggc tatttctgct       840 cgcgtgcacc cgactctatt acctgtgtcc cacccactgg cgtcggtaaa caagtccttt      900
aatgcaatct tgttgaagc agaagcagct ggtcgcctga tgttctacgg aaacggtgca      960
ggtggcgcgc caaccgcgtc tgctgtgctt ggcgacgtcg ttggtgccgc acgaaacaag     1020
gtgcacggtg gccgtgctcc aggtgagtcc acctacgcta acctgccgat cgctgatttc     1080
ggtgagacca ccactcgtta ccacctcgac atggatgtgg aagatcgcgt gggggttttg     1140
gctgaattgg ctagcctgtt ctctgagcaa ggaatctccc tgcgtacaat ccgacaggaa     1200
gagcgcgatg atgatgcaca tctgatcgtg gtcacccact ctgcgctgga atctgatctt     1260
tcccgcaccg ttgaactgct gaaggctaag cctgttgtta aggcaatcaa cagtgtgatc     1320
cgcctcgaaa gggactaa                                                  1338

<210> SEQ ID NO 18
<211> LENGTH: 35
<212> TYPE: DNA
<213> ORGANISM: Artificial Sequence
<220> FEATURE:
<223> OTHER INFORMATION: Synthetic: primer5

<400> SEQUENCE: 18
tcgagctcgg tacccgctt ttgcactcat cgagc                                   35

<210> SEQ ID NO 19
<211> LENGTH: 23
<212> TYPE: DNA
<213> ORGANISM: Artificial Sequence
<220> FEATURE:
<223> OTHER INFORMATION: Synthetic: primer6

<400> SEQUENCE: 19
cacgatcaga tgtgcatcat cat                                               23

<210> SEQ ID NO 20
<211> LENGTH: 23
<212> TYPE: DNA
<213> ORGANISM: Artificial Sequence
<220> FEATURE:
<223> OTHER INFORMATION: Synthetic: primer7

<400> SEQUENCE: 20
atgatgatgc acatctgatc gtg                                               23
```

<210> SEQ ID NO 21
<211> LENGTH: 35
<212> TYPE: DNA
<213> ORGANISM: Artificial Sequence
<220> FEATURE:
<223> OTHER INFORMATION: Synthetic: primer8

<400> SEQUENCE: 21
ctctagagga tccccgagca tcttccaaaa ccttg            35

<210> SEQ ID NO 22
<211> LENGTH: 1311
<212> TYPE: DNA
<213> ORGANISM: Artificial Sequence
<220> FEATURE:
<223> OTHER INFORMATION: Synthetic: ilvA(T381A, F383A)

<400> SEQUENCE: 22
atgagtgaaa catacgtgtc tgagaaaagt ccaggagtga tggctagcgg agcggagctg        60
attcgtgccg ccgacattca aacggcgcag gcacgaattt cctccgtcat tgcaccaact       120
ccattgcagt attgccctcg tctttctgag gaaaccggag cggaaatcta ccttaagcgt       180
gaggatctgc aggatgttcg ttcctacaag atccgcggtg cgctgaactc tggagcgcag       240
ctcacccaag agcagcgcga tgcaggtatc gttgccgcat ctgcaggtaa ccatgcccag       300
ggcgtggcct atgtgtgcaa gtccttgggc gttcagggac gcatctatgt tcctgtgcag       360
actccaaagc aaaagcgtga ccgcatcatg gttcacggcg agagtttgt ctccttggtg       420
gtcactggca ataacttcga cgaagcatcg gctgcagcgc atgaagatgc agagcgcacc       480
ggcgcaacgc tgatcgagcc tttcgatgct cgcaacaccg tcatcggtca gggcaccgtg       540
gctgctgaga tcttgtcgca gctgacttcc atgggcaaga gtgcagatca cgtgatggtt       600
ccagtcggcg gtggcggact tcttgcaggt gtggtcagct acatggctga tatggcacct       660
cgcactgcga tcgttggtat cgaaccagcg ggagcagcat ccatgcaggc tgcattgcac       720
aatggtggac caatcacttt ggagactgtt gatccctttg tggacggcgc agcagtcaaa       780
cgtgtcggag atctcaacta caccatcgtg gagaagaacc agggtcgcgt gcacatgatg       840
agcgcgaccg agggcgctgt gtgtactgag atgctcgatc tttaccaaaa cgaaggcatc       900
atcgcggagc tgctggcgc gctgtctatc gctgggttga aggaaatgtc ctttgcacct       960
ggttctgtcg tggtgcat catctctggt ggcaacaacg atgtgctgcg ttatgcggaa      1020
atcgctgagc gctccttggt gcaccgcggt ttgaagcact acttcttggt gaacttcccg      1080
caaaagcctg gtcagttgcg tcacttcctg gaagatatcc tgggaccgga tgatgacatc      1140
gcgctggcag agtacctcaa gcgcaacaac cgtgagaccg gtactgcgtt ggtgggtatt      1200
cacttgagtg aagcatcagg attggattct ttgctggaac gtatggagga atcggcaatt      1260
gattcccgtc gcctcgagcc gggcacccct gagtacgaat acttgaccta a              1311

<210> SEQ ID NO 23
<211> LENGTH: 436
<212> TYPE: PRT
<213> ORGANISM: Artificial Sequence
<220> FEATURE:
<223> OTHER INFORMATION: Synthetic: IlvA(T381A, F383A)

<400> SEQUENCE: 23

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg

-continued

```
                 20                  25                  30
Ile Ser Ser Val Ile Ala Pro Thr Pro Leu Gln Tyr Cys Pro Arg Leu
             35                  40                  45
Ser Glu Glu Thr Gly Ala Glu Ile Tyr Leu Lys Arg Glu Asp Leu Gln
         50                  55                  60
Asp Val Arg Ser Tyr Lys Ile Arg Gly Ala Leu Asn Ser Gly Ala Gln
 65                  70                  75                  80
Leu Thr Gln Glu Gln Arg Asp Ala Gly Ile Val Ala Ala Ser Ala Gly
                 85                  90                  95
Asn His Ala Gln Gly Val Ala Tyr Val Cys Lys Ser Leu Gly Val Gln
            100                 105                 110
Gly Arg Ile Tyr Val Pro Val Gln Thr Pro Lys Gln Lys Arg Asp Arg
        115                 120                 125
Ile Met Val His Gly Gly Glu Phe Val Ser Leu Val Val Thr Gly Asn
        130                 135                 140
Asn Phe Asp Glu Ala Ser Ala Ala Ala His Glu Asp Ala Glu Arg Thr
145                 150                 155                 160
Gly Ala Thr Leu Ile Glu Pro Phe Asp Ala Arg Asn Thr Val Ile Gly
                165                 170                 175
Gln Gly Thr Val Ala Ala Glu Ile Leu Ser Gln Leu Thr Ser Met Gly
            180                 185                 190
Lys Ser Ala Asp His Val Met Val Pro Val Gly Gly Gly Gly Leu Leu
        195                 200                 205
Ala Gly Val Val Ser Tyr Met Ala Asp Met Ala Pro Arg Thr Ala Ile
        210                 215                 220
Val Gly Ile Glu Pro Ala Gly Ala Ala Ser Met Gln Ala Ala Leu His
225                 230                 235                 240
Asn Gly Gly Pro Ile Thr Leu Glu Thr Val Asp Pro Phe Val Asp Gly
                245                 250                 255
Ala Ala Val Lys Arg Val Gly Asp Leu Asn Tyr Thr Ile Val Glu Lys
            260                 265                 270
Asn Gln Gly Arg Val His Met Met Ser Ala Thr Glu Gly Ala Val Cys
        275                 280                 285
Thr Glu Met Leu Asp Leu Tyr Gln Asn Glu Gly Ile Ile Ala Glu Pro
        290                 295                 300
Ala Gly Ala Leu Ser Ile Ala Gly Leu Lys Glu Met Ser Phe Ala Pro
305                 310                 315                 320
Gly Ser Val Val Val Cys Ile Ile Ser Gly Gly Asn Asn Asp Val Leu
                325                 330                 335
Arg Tyr Ala Glu Ile Ala Glu Arg Ser Leu Val His Arg Gly Leu Lys
            340                 345                 350
His Tyr Phe Leu Val Asn Phe Pro Gln Lys Pro Gly Gln Leu Arg His
        355                 360                 365
Phe Leu Glu Asp Ile Leu Gly Pro Asp Asp Ile Ala Leu Ala Glu
        370                 375                 380
Tyr Leu Lys Arg Asn Asn Arg Glu Thr Gly Thr Ala Leu Val Gly Ile
385                 390                 395                 400
His Leu Ser Glu Ala Ser Gly Leu Asp Ser Leu Leu Glu Arg Met Glu
                405                 410                 415
Glu Ser Ala Ile Asp Ser Arg Arg Leu Glu Pro Gly Thr Pro Glu Tyr
            420                 425                 430
Glu Tyr Leu Thr
        435
```

<210> SEQ ID NO 24
<211> LENGTH: 436
<212> TYPE: PRT
<213> ORGANISM: Artificial Sequence
<220> FEATURE:
<223> OTHER INFORMATION: Synthetic:  ilvA(T381S, F383A)

<400> SEQUENCE: 24

```
Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Val Thr Gly Asn
    130                 135                 140

Asn Phe Asp Glu Ala Ser Ala Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
        195                 200                 205

Ala Gly Val Val Ser Tyr Met Ala Asp Met Ala Pro Arg Thr Ala Ile
    210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
        275                 280                 285

Thr Glu Met Leu Asp Leu Tyr Gln Asn Glu Gly Ile Ile Ala Glu Pro
    290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
        355                 360                 365
```

Phe Leu Glu Asp Ile Leu Gly Pro Asp Asp Ile Ser Leu Ala Glu
        370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Arg Met Glu
            405                 410                 415

Glu Ser Ala Ile Asp Ser Arg Arg Leu Glu Pro Gly Thr Pro Glu Tyr
            420                 425                 430

Glu Tyr Leu Thr
            435

<210> SEQ ID NO 25
<211> LENGTH: 436
<212> TYPE: PRT
<213> ORGANISM: Artificial Sequence
<220> FEATURE:
<223> OTHER INFORMATION: Synthetic: ilvA(T381P, F383A)

<400> SEQUENCE: 25

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Val Thr Gly Asn
130                 135                 140

Asn Phe Asp Glu Ala Ser Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
        195                 200                 205

Ala Gly Val Val Ser Tyr Met Ala Asp Met Ala Pro Arg Thr Ala Ile
    210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
        275                 280                 285

```
Thr Glu Met Leu Asp Leu Tyr Gln Asn Glu Gly Ile Ile Ala Glu Pro
        290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                    325                 330                 335

Arg Tyr Ala Glu Ile Ala Glu Arg Ser Leu Val His Arg Gly Leu Lys
                340                 345                 350

His Tyr Phe Leu Val Asn Phe Pro Gln Lys Pro Gly Gln Leu Arg His
            355                 360                 365

Phe Leu Glu Asp Ile Leu Gly Pro Asp Asp Ile Pro Leu Ala Glu
        370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
                405                 410                 415

Glu Ser Ala Ile Asp Ser Arg Arg Leu Glu Pro Gly Thr Pro Glu Tyr
                420                 425                 430

Glu Tyr Leu Thr
            435

<210> SEQ ID NO 26
<211> LENGTH: 436
<212> TYPE: PRT
<213> ORGANISM: Artificial Sequence
<220> FEATURE:
<223> OTHER INFORMATION: Synthetic: ilvA(T381Q, F383A)

<400> SEQUENCE: 26

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Val Thr Gly Asn
    130                 135                 140

Asn Phe Asp Glu Ala Ser Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
        195                 200                 205
```

```
Ala Gly Val Val Ser Tyr Met Ala Asp Met Ala Pro Arg Thr Ala Ile
    210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
                260                 265                 270

Asn Gln Gly Arg Val His Met Met Ser Ala Thr Glu Gly Ala Val Cys
            275                 280                 285

Thr Glu Met Leu Asp Leu Tyr Gln Asn Glu Gly Ile Ile Ala Glu Pro
        290                 295                 300

Ala Gly Ala Leu Ser Ile Ala Gly Leu Lys Glu Met Ser Phe Ala Pro
305                 310                 315                 320

Gly Ser Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
                340                 345                 350

His Tyr Phe Leu Val Asn Phe Pro Gln Lys Pro Gly Gln Leu Arg His
            355                 360                 365

Phe Leu Glu Asp Ile Leu Gly Pro Asp Asp Ile Gln Leu Ala Glu
370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
                405                 410                 415

Glu Ser Ala Ile Asp Ser Arg Arg Leu Glu Pro Gly Thr Pro Glu Tyr
                420                 425                 430

Glu Tyr Leu Thr
        435

<210> SEQ ID NO 27
<211> LENGTH: 436
<212> TYPE: PRT
<213> ORGANISM: Artificial Sequence
<220> FEATURE:
<223> OTHER INFORMATION: Synthetic: ilvA(T381V, F383A)

<400> SEQUENCE: 27

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125
```

```
Ile Met Val His Gly Gly Glu Phe Val Ser Leu Val Thr Gly Asn
    130                 135                 140

Asn Phe Asp Glu Ala Ser Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
        195                 200                 205

Ala Gly Val Val Ser Tyr Met Ala Asp Met Ala Pro Arg Thr Ala Ile
210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
        275                 280                 285

Thr Glu Met Leu Asp Leu Tyr Gln Asn Glu Gly Ile Ile Ala Glu Pro
290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
        355                 360                 365

Phe Leu Glu Asp Ile Leu Gly Pro Asp Asp Ile Val Leu Ala Glu
370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
                405                 410                 415

Glu Ser Ala Ile Asp Ser Arg Arg Leu Glu Pro Gly Thr Pro Glu Tyr
            420                 425                 430

Glu Tyr Leu Thr
        435

<210> SEQ ID NO 28
<211> LENGTH: 436
<212> TYPE: PRT
<213> ORGANISM: Artificial Sequence
<220> FEATURE:
<223> OTHER INFORMATION: Synthetic: ilvA(T381I, F383A)

<400> SEQUENCE: 28

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45
```

```
Ser Glu Glu Thr Gly Ala Glu Ile Tyr Leu Lys Arg Glu Asp Leu Gln
 50                  55                  60

Asp Val Arg Ser Tyr Lys Ile Arg Gly Ala Leu Asn Ser Gly Ala Gln
 65                  70                  75                  80

Leu Thr Gln Glu Gln Arg Asp Ala Gly Ile Val Ala Ala Ser Ala Gly
                 85                  90                  95

Asn His Ala Gln Gly Val Ala Tyr Val Cys Lys Ser Leu Gly Val Gln
                100                 105                 110

Gly Arg Ile Tyr Val Pro Val Gln Thr Pro Lys Gln Lys Arg Asp Arg
                115                 120                 125

Ile Met Val His Gly Gly Glu Phe Val Ser Leu Val Val Thr Gly Asn
130                 135                 140

Asn Phe Asp Glu Ala Ser Ala Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
                180                 185                 190

Lys Ser Ala Asp His Val Met Val Pro Val Gly Gly Gly Leu Leu
                195                 200                 205

Ala Gly Val Val Ser Tyr Met Ala Asp Met Ala Pro Arg Thr Ala Ile
210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
                260                 265                 270

Asn Gln Gly Arg Val His Met Met Ser Ala Thr Glu Gly Ala Val Cys
                275                 280                 285

Thr Glu Met Leu Asp Leu Tyr Gln Asn Glu Gly Ile Ile Ala Glu Pro
290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
                340                 345                 350

His Tyr Phe Leu Val Asn Phe Pro Gln Lys Pro Gly Gln Leu Arg His
                355                 360                 365

Phe Leu Glu Asp Ile Leu Gly Pro Asp Asp Ile Ile Leu Ala Glu
370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
                405                 410                 415

Glu Ser Ala Ile Asp Ser Arg Arg Leu Glu Pro Gly Thr Pro Glu Tyr
                420                 425                 430

Glu Tyr Leu Thr
            435

<210> SEQ ID NO 29
<211> LENGTH: 436
```

```
<212> TYPE: PRT
<213> ORGANISM: Artificial Sequence
<220> FEATURE:
<223> OTHER INFORMATION: Synthetic: ilvA(T381G, F383A)

<400> SEQUENCE: 29
```

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
    50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
                85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Val Thr Gly Asn
130                 135                 140

Asn Phe Asp Glu Ala Ser Ala Ala His Glu Asp Ala Glu Arg Thr
145                 150                 155                 160

Gly Ala Thr Leu Ile Glu Pro Phe Asp Ala Arg Asn Thr Val Ile Gly
                165                 170                 175

Gln Gly Thr Val Ala Ala Glu Ile Leu Ser Gln Leu Thr Ser Met Gly
            180                 185                 190

Lys Ser Ala Asp His Val Met Val Pro Val Gly Gly Gly Gly Leu Leu
        195                 200                 205

Ala Gly Val Val Ser Tyr Met Ala Asp Met Ala Pro Arg Thr Ala Ile
210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
                245                 250                 255

Ala Ala Val Lys Arg Val Gly Asp Leu Asn Tyr Thr Ile Val Glu Lys
            260                 265                 270

Asn Gln Gly Arg Val His Met Met Ser Ala Thr Glu Gly Ala Val Cys
        275                 280                 285

Thr Glu Met Leu Asp Leu Tyr Gln Asn Glu Gly Ile Ile Ala Glu Pro
290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
                325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
        355                 360                 365

Phe Leu Glu Asp Ile Leu Gly Pro Asp Asp Ile Gly Leu Ala Glu
370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
            405                 410                 415

Glu Ser Ala Ile Asp Ser Arg Arg Leu Glu Pro Gly Thr Pro Glu Tyr
            420                 425                 430

Glu Tyr Leu Thr
        435

<210> SEQ ID NO 30
<211> LENGTH: 436
<212> TYPE: PRT
<213> ORGANISM: Artificial Sequence
<220> FEATURE:
<223> OTHER INFORMATION: Synthetic: ilvA(T381M, F383A)

<400> SEQUENCE: 30

Met Ser Glu Thr Tyr Val Ser Glu Lys Ser Pro Gly Val Met Ala Ser
1               5                   10                  15

Gly Ala Glu Leu Ile Arg Ala Ala Asp Ile Gln Thr Ala Gln Ala Arg
            20                  25                  30

Ile Ser Ser Val Ile Ala Pro Thr Pro Leu Gln Tyr Cys Pro Arg Leu
        35                  40                  45

Ser Glu Glu Thr Gly Ala Glu Ile Tyr Leu Lys Arg Glu Asp Leu Gln
50                  55                  60

Asp Val Arg Ser Tyr Lys Ile Arg Gly Ala Leu Asn Ser Gly Ala Gln
65                  70                  75                  80

Leu Thr Gln Glu Gln Arg Asp Ala Gly Ile Val Ala Ala Ser Ala Gly
            85                  90                  95

Asn His Ala Gln Gly Val Ala Tyr Val Cys Lys Ser Leu Gly Val Gln
            100                 105                 110

Gly Arg Ile Tyr Val Pro Val Gln Thr Pro Lys Gln Lys Arg Asp Arg
        115                 120                 125

Ile Met Val His Gly Gly Glu Phe Val Ser Leu Val Val Thr Gly Asn
130                 135                 140

Asn Phe Asp Glu Ala Ser Ala Ala His Glu Asp Ala Glu Arg Thr
145                 150                 155                 160

Gly Ala Thr Leu Ile Glu Pro Phe Asp Ala Arg Asn Thr Val Ile Gly
            165                 170                 175

Gln Gly Thr Val Ala Ala Glu Ile Leu Ser Gln Leu Thr Ser Met Gly
        180                 185                 190

Lys Ser Ala Asp His Val Met Val Pro Val Gly Gly Gly Gly Leu Leu
            195                 200                 205

Ala Gly Val Val Ser Tyr Met Ala Asp Met Ala Pro Arg Thr Ala Ile
210                 215                 220

Val Gly Ile Glu Pro Ala Gly Ala Ala Ser Met Gln Ala Ala Leu His
225                 230                 235                 240

Asn Gly Gly Pro Ile Thr Leu Glu Thr Val Asp Pro Phe Val Asp Gly
            245                 250                 255

Ala Ala Val Lys Arg Val Gly Asp Leu Asn Tyr Thr Ile Val Glu Lys
        260                 265                 270

Asn Gln Gly Arg Val His Met Met Ser Ala Thr Glu Gly Ala Val Cys
            275                 280                 285

Thr Glu Met Leu Asp Leu Tyr Gln Asn Glu Gly Ile Ile Ala Glu Pro
        290                 295                 300

Ala Gly Ala Leu Ser Ile Ala Gly Leu Lys Glu Met Ser Phe Ala Pro
305                 310                 315                 320

Gly Ser Val Val Val Cys Ile Ile Ser Gly Gly Asn Asn Asp Val Leu
            325                 330                 335

Arg Tyr Ala Glu Ile Ala Glu Arg Ser Leu Val His Arg Gly Leu Lys
            340                 345                 350

His Tyr Phe Leu Val Asn Phe Pro Gln Lys Pro Gly Gln Leu Arg His
        355                 360                 365

Phe Leu Glu Asp Ile Leu Gly Pro Asp Asp Ile Met Leu Ala Glu
    370                 375                 380

Tyr Leu Lys Arg Asn Asn Arg Glu Thr Gly Thr Ala Leu Val Gly Ile
385                 390                 395                 400

His Leu Ser Glu Ala Ser Gly Leu Asp Ser Leu Leu Glu Arg Met Glu
            405                 410                 415

Glu Ser Ala Ile Asp Ser Arg Arg Leu Glu Pro Gly Thr Pro Glu Tyr
            420                 425                 430

Glu Tyr Leu Thr
        435

<210> SEQ ID NO 31
<211> LENGTH: 35
<212> TYPE: DNA
<213> ORGANISM: Artificial Sequence
<220> FEATURE:
<223> OTHER INFORMATION: Synthetic: primer9

<400> SEQUENCE: 31
tcgagctcgg tacccatgag tgaaacatac gtgtc                                  35

<210> SEQ ID NO 32
<211> LENGTH: 34
<212> TYPE: DNA
<213> ORGANISM: Artificial Sequence
<220> FEATURE:
<223> OTHER INFORMATION: Synthetic: primer10

<400> SEQUENCE: 32
ctctagagga tcccccgtca ccgacacctc caca                                   34

<210> SEQ ID NO 33
<211> LENGTH: 25
<212> TYPE: DNA
<213> ORGANISM: Artificial Sequence
<220> FEATURE:
<223> OTHER INFORMATION: Synthetic: primer15

<400> SEQUENCE: 33
aggtactctg ccagggagat gtcat                                             25

<210> SEQ ID NO 34
<211> LENGTH: 25
<212> TYPE: DNA
<213> ORGANISM: Artificial Sequence
<220> FEATURE:
<223> OTHER INFORMATION: Synthetic: primer16

<400> SEQUENCE: 34
atgacatctc cctggcagag tacct                                             25

<210> SEQ ID NO 35
<211> LENGTH: 25
<212> TYPE: DNA

```
<213> ORGANISM: Artificial Sequence
<220> FEATURE:
<223> OTHER INFORMATION: Synthetic: primer21

<400> SEQUENCE: 35
aggtactctg ccagtgggat gtcat                                 25

<210> SEQ ID NO 36
<211> LENGTH: 25
<212> TYPE: DNA
<213> ORGANISM: Artificial Sequence
<220> FEATURE:
<223> OTHER INFORMATION: Synthetic: primer22

<400> SEQUENCE: 36
atgacatccc actggcagag tacct                                 25

<210> SEQ ID NO 37
<211> LENGTH: 25
<212> TYPE: DNA
<213> ORGANISM: Artificial Sequence
<220> FEATURE:
<223> OTHER INFORMATION: Synthetic: primer27

<400> SEQUENCE: 37
aggtactctg ccagctggat gtcat                                 25

<210> SEQ ID NO 38
<211> LENGTH: 25
<212> TYPE: DNA
<213> ORGANISM: Artificial Sequence
<220> FEATURE:
<223> OTHER INFORMATION: Synthetic: primer28

<400> SEQUENCE: 38
atgacatcca gctggcagag tacct                                 25

<210> SEQ ID NO 39
<211> LENGTH: 25
<212> TYPE: DNA
<213> ORGANISM: Artificial Sequence
<220> FEATURE:
<223> OTHER INFORMATION: Synthetic: primer33

<400> SEQUENCE: 39
aggtactctg ccagaacgat gtcat                                 25

<210> SEQ ID NO 40
<211> LENGTH: 25
<212> TYPE: DNA
<213> ORGANISM: Artificial Sequence
<220> FEATURE:
<223> OTHER INFORMATION: Synthetic: primer34

<400> SEQUENCE: 40
atgacatcgt tctggcagag tacct                                 25

<210> SEQ ID NO 41
<211> LENGTH: 25
<212> TYPE: DNA
<213> ORGANISM: Artificial Sequence
<220> FEATURE:
<223> OTHER INFORMATION: Synthetic: primer35

<400> SEQUENCE: 41
aggtactctg ccaggatgat gtcat                                 25
```

<210> SEQ ID NO 42
<211> LENGTH: 25
<212> TYPE: DNA
<213> ORGANISM: Artificial Sequence
<220> FEATURE:
<223> OTHER INFORMATION: Synthetic: primer36

<400> SEQUENCE: 42
atgacatcat cctggcagag tacct                                    25

<210> SEQ ID NO 43
<211> LENGTH: 25
<212> TYPE: DNA
<213> ORGANISM: Artificial Sequence
<220> FEATURE:
<223> OTHER INFORMATION: Synthetic: primer41

<400> SEQUENCE: 43
aggtactctg ccaggccgat gtcat                                    25

<210> SEQ ID NO 44
<211> LENGTH: 25
<212> TYPE: DNA
<213> ORGANISM: Artificial Sequence
<220> FEATURE:
<223> OTHER INFORMATION: Synthetic: primer42

<400> SEQUENCE: 44
atgacatcgg cctggcagag tacct                                    25

<210> SEQ ID NO 45
<211> LENGTH: 25
<212> TYPE: DNA
<213> ORGANISM: Artificial Sequence
<220> FEATURE:
<223> OTHER INFORMATION: Synthetic: primer45

<400> SEQUENCE: 45
aggtactctg ccagcatgat gtcat                                    25

<210> SEQ ID NO 46
<211> LENGTH: 25
<212> TYPE: DNA
<213> ORGANISM: Artificial Sequence
<220> FEATURE:
<223> OTHER INFORMATION: Synthetic: primer46

<400> SEQUENCE: 46
atgacatcat gctggcagag tacct                                    25

<210> SEQ ID NO 47
<211> LENGTH: 33
<212> TYPE: DNA
<213> ORGANISM: Artificial Sequence
<220> FEATURE:
<223> OTHER INFORMATION: Synthetic: primer47

<400> SEQUENCE: 47
ccggatgatg acatcgctct gtttgagtac ctc                           33

<210> SEQ ID NO 48
<211> LENGTH: 26
<212> TYPE: DNA
<213> ORGANISM: Artificial Sequence
<220> FEATURE:

<223> OTHER INFORMATION: Synthetic: primer48

<400> SEQUENCE: 48
tcaaacagag cgatgtcatc atccgg                                        26

<210> SEQ ID NO 49
<211> LENGTH: 421
<212> TYPE: PRT
<213> ORGANISM: Artificial Sequence
<220> FEATURE:
<223> OTHER INFORMATION: Synthetic: lysC(L377K)

<400> SEQUENCE: 49

```
Val Ala Leu Val Val Gln Lys Tyr Gly Gly Ser Ser Leu Glu Ser Ala
1               5                   10                  15

Glu Arg Ile Arg Asn Val Ala Glu Arg Ile Val Ala Thr Lys Lys Ala
            20                  25                  30

Gly Asn Asp Val Val Val Val Cys Ser Ala Met Gly Asp Thr Thr Asp
        35                  40                  45

Glu Leu Leu Glu Leu Ala Ala Ala Val Asn Pro Val Pro Pro Ala Arg
    50                  55                  60

Glu Met Asp Met Leu Leu Thr Ala Gly Glu Arg Ile Ser Asn Ala Leu
65                  70                  75                  80

Val Ala Met Ala Ile Glu Ser Leu Gly Ala Glu Ala Gln Ser Phe Thr
                85                  90                  95

Gly Ser Gln Ala Gly Val Leu Thr Thr Glu Arg His Gly Asn Ala Arg
            100                 105                 110

Ile Val Asp Val Thr Pro Gly Arg Val Arg Glu Ala Leu Asp Glu Gly
        115                 120                 125

Lys Ile Cys Ile Val Ala Gly Phe Gln Gly Val Asn Lys Glu Thr Arg
    130                 135                 140

Asp Val Thr Thr Leu Gly Arg Gly Gly Ser Asp Thr Thr Ala Val Ala
145                 150                 155                 160

Leu Ala Ala Ala Leu Asn Ala Asp Val Cys Glu Ile Tyr Ser Asp Val
                165                 170                 175

Asp Gly Val Tyr Thr Ala Asp Pro Arg Ile Val Pro Asn Ala Gln Lys
            180                 185                 190

Leu Glu Lys Leu Ser Phe Glu Glu Met Leu Glu Leu Ala Ala Val Gly
        195                 200                 205

Ser Lys Ile Leu Val Leu Arg Ser Val Glu Tyr Ala Arg Ala Phe Asn
    210                 215                 220

Val Pro Leu Arg Val Arg Ser Ser Tyr Ser Asn Asp Pro Gly Thr Leu
225                 230                 235                 240

Ile Ala Gly Ser Met Glu Asp Ile Pro Val Glu Glu Ala Val Leu Thr
                245                 250                 255

Gly Val Ala Thr Asp Lys Ser Glu Ala Lys Val Thr Val Leu Gly Ile
            260                 265                 270

Ser Asp Lys Pro Gly Glu Ala Ala Lys Val Phe Arg Ala Leu Ala Asp
        275                 280                 285

Ala Glu Ile Asn Ile Asp Met Val Leu Gln Asn Val Ser Ser Val Glu
    290                 295                 300

Asp Gly Thr Thr Asp Ile Thr Phe Thr Cys Pro Arg Ser Asp Gly Arg
305                 310                 315                 320

Arg Ala Met Glu Ile Leu Lys Lys Leu Gln Val Gln Gly Asn Trp Thr
                325                 330                 335
```

```
Asn Val Leu Tyr Asp Asp Gln Val Gly Lys Val Ser Leu Val Gly Ala
            340             345             350

Gly Met Lys Ser His Pro Gly Val Thr Ala Glu Phe Met Glu Ala Leu
            355             360             365

Arg Asp Val Asn Val Asn Ile Glu Lys Ile Ser Thr Ser Glu Ile Arg
        370             375             380

Ile Ser Val Leu Ile Arg Glu Asp Asp Leu Asp Ala Ala Ala Arg Ala
385             390             395             400

Leu His Glu Gln Phe Gln Leu Gly Gly Glu Asp Glu Ala Val Val Tyr
            405             410             415

Ala Gly Thr Gly Arg
            420

<210> SEQ ID NO 50
<211> LENGTH: 29
<212> TYPE: DNA
<213> ORGANISM: Artificial Sequence
<220> FEATURE:
<223> OTHER INFORMATION: Synthetic:  lysC_L377K_5 F

<400> SEQUENCE: 50
tcctctagag ctgcgcagtg ttgaatacg                                      29

<210> SEQ ID NO 51
<211> LENGTH: 23
<212> TYPE: DNA
<213> ORGANISM: Artificial Sequence
<220> FEATURE:
<223> OTHER INFORMATION: Synthetic:  lysC_L377K_5 R

<400> SEQUENCE: 51
aggtggaaat cttttcgatg ttc                                            23

<210> SEQ ID NO 52
<211> LENGTH: 23
<212> TYPE: DNA
<213> ORGANISM: Artificial Sequence
<220> FEATURE:
<223> OTHER INFORMATION: Synthetic:  lysC_L377K_3 F

<400> SEQUENCE: 52
gaacatcgaa aagatttcca cct                                            23

<210> SEQ ID NO 53
<211> LENGTH: 29
<212> TYPE: DNA
<213> ORGANISM: Artificial Sequence
<220> FEATURE:
<223> OTHER INFORMATION: Synthetic:  lysC_L377K_3 R

<400> SEQUENCE: 53
gactctagag ttcacctcag agacgatta                                      29
```

L-THREONINE DEHYDRATASE VARIANT AND METHOD OF PRODUCING L-ISOLEUCINE USING THE SAME

CROSS-REFERENCE TO RELATED APPLICATIONS

The present application is a 35 USC 371 national phase filing of PCT/KR2021/005037 filed on Apr. 21, 2021, which claims the benefit of and priority to Korean Patent Application No. 10-2020-0078669 filed on Jun. 26, 2020, both applications are incorporated herein by reference in their entirety.

INCORPORATION BY REFERENCE

The present application contains a Sequence Listing which has been submitted in ASCII format via EFS-Web and is hereby incorporated by reference in its entirety. Said ASCII copy having been modified on Sep. 9, 2021, is named "059520_00025_ST25.txt" and is 86,193 bytes in size.

TECHNICAL FIELD

The present disclosure relates to a novel L-threonine dehydratase variant and a method of producing L-isoleucine using the same.

BACKGROUND ART

L-Isoleucine, one of the branched-chain amino acids among a total of 20 amino acids, is classified as an essential amino acid and has been used in animal feeds, food additives, and medicines. L-Isoleucine is metabolized to generate energy, produce hemoglobin, regulate blood sugar, build and maintain muscles, etc., and thus use of L-isoleucine is increasing not only in injectable fluids, nutritional supplements, and sport nutritional foods, but also in animal feeds.

For L-isoleucine production, *Corynebacterium glutamicum* and *Escherichia coli* have been used as representative microorganisms. In such microorganisms, L-isoleucine shares a main biosynthesis pathway with other branched-chain amino acids, e.g., L-valine and L-leucine. In the biosynthesis pathway of L-isoleucine, pyruvate produced in glycolysis and 2-ketobutyrate produced from L-threonine, which is an amino acid derived from aspartate (aspartic acid), are used as precursors to ultimately produce L-isoleucine.

In this regard, 2-ketobutyrate is produced from L-threonine by L-threonine dehydratase (TD, EC 4.3.1.19) encoded by ilvA gene. As sensitivity of L-threonine dehydratase to threonine concentration increases, L-isoleucine producing capability may be enhanced, and L-threonine dehydratase has been known to be affected by feedback inhibition by L-isoleucine (Peng et al. *Bioprocess Biosyst Eng* 33:339-345. 2010; Guillouet et al. *Appl Microbiol Biotechnol.* 2001 December; 57(5-6):667-73.). Therefore, L-threonine dehydratase may be a limiting factor in the production of L-isoleucine and may also be a very important enzyme for improving the isoleucine producing capability.

DISCLOSURE

Technical Problem

As a result of intensive efforts to increase production of L-isoleucine in microorganisms, the present inventors have found an ilvA variant capable of increasing L-isoleucine production and developed a microorganism having enhanced L-isoleucine producing capability, thereby completing the present disclosure.

Technical Solution

The present disclosure provides a L-threonine dehydratase variant in which an amino acid at the $381^{st}$ position of an amino acid sequence of SEQ ID NO: 1 is substituted with a different amino acid.

The present disclosure also provides a polynucleotide encoding the variant of the present disclosure.

The present disclosure also provides a vector including the polynucleotide of the present disclosure.

The present disclosure also provides an L-isoleucine-producing microorganism including at least one of: the variant of the present disclosure; a polynucleotide encoding the variant of the present disclosure; and a vector including the polynucleotide of the present disclosure.

The present disclosure also provides a method of producing L-isoleucine, the method including culturing a microorganism including at least one of: the variant of the present disclosure; a polynucleotide encoding the variant of the present disclosure; and a vector including the polynucleotide of the present disclosure, in a culture medium.

The present disclosure also provides a composition for producing L-isoleucine including the microorganism of the present disclosure or cultures of the microorganism of the present disclosure.

Advantageous Effects

When a microorganism having L-isoleucine producing capability is cultured using the L-threonine dehydratase variant of the present disclosure, L-isoleucine may be produced with a higher yield than when using conventional non-modified proteins.

BEST MODE

Hereinafter, the present disclosure will be described in detail. Meanwhile, each of the descriptions and embodiments disclosed herein may be applied to describe different descriptions and embodiments. That is, all of the combinations of various factors disclosed herein belong to the scope of the present disclosure. Furthermore, the scope of the present disclosure should not be limited by the detailed descriptions provided hereinbelow.

An aspect of the present disclosure provides a L-threonine dehydratase variant in which an amino acid corresponding to the $381^{st}$ position of an amino acid sequence of SEQ ID NO: 1 is substituted with a different amino acid.

Specifically, the variant may be one in which the amino acid corresponding to the $381^{st}$ position of the amino acid sequence of SEQ ID NO: 1 is substituted with one amino acid selected from the group consisting of alanine, serine, proline, glutamine, valine, isoleucine, glycine, and methionine, without being limited thereto.

Also, the variant of the present disclosure may be one in which an amino acid corresponding to the $383^{rd}$ position of the amino acid sequence of SEQ ID NO: 1 is further substituted with a different amino acid in addition to the substituted amino acid corresponding to the $381^{st}$ position of the amino acid sequence of SEQ ID NO: 1, without being limited thereto. The different amino acid may specifically be a non-polar amino acid, more specifically alanine, without being limited thereto.

As used herein, the term "L-isoleucine" refers to an L-amino acid which is one of the essential amino acids, structurally belonging to the branched-chain amino acids along with L-valine and L-leucine and having a chemical formula of $HO_2CCH(NH_2)CH(CH_3)CH_2CH_3$.

As used herein, the term "L-threonine dehydratase" refers to an enzyme involved in the biosynthesis pathway of L-isoleucine and producing 2-ketobutyrate from L-threonine, which is an amino acid derived from aspartate, in the biosynthesis pathway of L-isoleucine. L-Isoleucine is produced using the 2-ketobutyrate and pyruvate produced in glycolysis as precursors.

The L-threonine dehydratase may be, for example, a protein including the amino acid sequence of SEQ ID NO: 1. The protein including the amino acid sequence of SEQ ID NO: 1 may be used interchangeably with a protein having the amino acid sequence of SEQ ID NO: 1 and a protein consisting of the amino acid sequence of SEQ ID NO: 1.

Specifically, the amino acid sequence of SEQ ID NO: 1 may be an amino acid sequence of L-threonine dehydratase encoded by ilvA gene. The amino acid sequence of SEQ ID NO: 1 may be obtained from the known database of NCBI Genbank. For example, the amino acid sequence may be derived from *Corynebacterium glutamicum*, but is not limited thereto, and may include any sequence having the same activity as that of the amino acid sequence without limitation. In addition, although L-threonine dehydratase is defined as a protein including the amino acid sequence of SEQ ID NO: 1 in the present disclosure, it does not exclude a mutation that may occur naturally or by addition of a meaningless sequence upstream or downstream of the amino acid sequence of SEQ ID NO: 1 or a silent mutation thereof, and it is obvious to those skilled in the art that any proteins having activity identical or equivalent to the protein including the amino acid sequence of SEQ ID NO: 1 belong to the L-threonine dehydratase of the present disclosure. For example, the L-threonine dehydratase of the present disclosure may be a protein consisting of the amino acid sequence of SEQ ID NO: 1 or an amino acid sequence having at least 80%, 85%, 90%, 95%, 96%, 97%, 98%, or 99% homology or identity therewith. Also, it will be obvious that any protein having the amino acid sequence including deletion, modification, substitution, or addition of one or several amino acids is within the scope of the present disclosure as long as the amino acid sequence retains the above-described homology or identity and effects equivalent to those of the protein.

That is, although the expressions "protein or polypeptide having an amino acid sequence of a predetermined SEQ ID NO:" and "protein or polypeptide including an amino acid sequence of a predetermined SEQ ID NO:" are used in the present disclosure, it is obvious that any protein having the amino acid sequence including deletion, modification, substitution, or addition of one or several amino acids may also be used in the present disclosure, as long as the protein has activity identical or equivalent to the polypeptide consisting of the predetermined amino acid sequence. For example, it is obvious that a "polypeptide including the amino acid sequence of SEQ ID NO: 1" belongs to a "polypeptide consisting of the amino acid sequence of SEQ ID NO: 1" as long as the former has activity which is the same as or equivalent to that of the latter.

As used herein, the term "variant" refers to a polypeptide obtained by conservative substitution and/or modification of at least one amino acid different from that of the recited sequence while retaining functions or properties thereof. Such variants may generally be identified by modifying at least one amino acid of the above amino acid sequences of the polypeptide and evaluating properties of the modified polypeptide. That is, the ability of the variant may be enhanced, may not be changed, or may be reduced relative to the polypeptide before modification. In addition, some variants may include variants from which at least one portion such as an N-terminal leader sequence or a transmembrane domain have been removed. Other variants may include variants in which a portion has been removed from the N- and/or C-terminus of a mature protein. The term "variant" may also be used interchangeably with other terms such as modification, modified protein, modified polypeptide, mutant, mutein, and divergent, and any terms used to indicate variation may also be used without limitation.

In view of the objects of the present disclosure, the variant may have enhanced ability to produce L-isoleucine due to enhanced activity compared to wild-type or non-modified proteins, without being limited thereto.

As used herein, the term "conservative substitution" refers to substitution of one amino acid with a different amino acid having similar structural and/or chemical properties. Such amino acid substitution may generally occur based on similarity of polarity, charge, solubility, hydrophobicity, hydrophilicity, and/or amphipathic nature of a residue. In general, conservative substitution has little or no influence on the activity of a produced protein or polypeptide.

Variants may also include deletion or addition of amino acids that have minimal influence on properties and a secondary structure of a polypeptide. For example, the polypeptide may be conjugated to a signal (or leader) sequence at the N-terminus of a protein which co-translationally or post-translationally directs transfer of the protein. The polypeptide may also be conjugated with another sequence or linker to identify, purify, or synthesize the polypeptide.

In the present disclosure, the "substituted with a different amino acid" is not particularly limited as long as the amino acid after substitution is different from the amino acid before substitution. That is, the substitution with a different amino acid may be substitution of threonine, which is the $381^{st}$ amino acid from the N-terminus of the amino acid sequence of SEQ ID NO: 1, with another amino acid residue other than threonine, specifically with arginine, lysine, histidine, glutamic acid, aspartic acid, glycine, alanine, valine, leucine, isoleucine, methionine, phenylalanine, tryptophan, proline, serine, cysteine, tyrosine, asparagine, or glutamine. More specifically, threonine, as the amino acid corresponding to the $381^{st}$ position of the amino acid sequence of SEQ ID NO: 1, may be substituted with one amino acid selected from the group consisting of alanine, serine, proline, glutamine, valine, isoleucine, glycine, and methionine, without being limited thereto. Also, the substituted amino acid residue may include not only a natural amino acid, but also a non-natural amino acid. The non-natural amino acid may be, for example, a D-amino acid, a (homo)-amino acid, a (beta-homo)-amino acid, a N-methyl amino acid, an α-methyl amino acid, and an uncommon amino acid (e.g., citrulline or naphthylalanine), but is not limited thereto. Meanwhile, in the present disclosure, it is obvious that the expression "substituted with a predetermined amino acid" means that the amino acid after substitution is different from the amino acid before substitution unless the expression "substituted with a different amino acid" is provided.

Also, the variant may be one in which an amino acid corresponding to the 383$^{rd}$ position of the amino acid sequence of SEQ ID NO: 1 is further substituted with a different amino acid in addition to the substituted amino acid corresponding to the 381$^{st}$ position of the amino acid sequence of SEQ ID NO: 1. More specifically, the amino acid corresponding to the 383$^{rd}$ position of the amino acid sequence of SEQ ID NO: 1 may be substituted with a non-polar amino acid, and the non-polar amino acid may be alanine, without being limited thereto.

That is, the variant may be one in which i) the amino acid corresponding to the 381$^{st}$ position is substituted with one selected from the group consisting of alanine, serine, proline, glutamine, valine, isoleucine, glycine, and methionine, and/or ii) the amino acid corresponding to the 383$^{rd}$ position is substituted with alanine, in the amino acid sequence of SEQ ID NO: 1, without being limited thereto.

The variant may have a sequence homology of 80% or more and less than 100% with the amino acid sequence of SEQ ID NO: 1, but is not limited thereto. Specifically, the variant of the present disclosure may have at least 80%, 90%, 95%, 96%, 97%, 98%, or 99% homology with the amino acid sequence of SEQ ID NO: 1. Also, it is obvious that any protein having the amino acid sequence including deletion, modification, substitution, or addition of one or several amino acids at a position other than the 381$^{st}$ and/or 383$^{rd}$ positions is within the scope of the present disclosure as long as the protein retains the above-described homology and effects equivalent to those of the variant.

As used herein, the term "corresponding to" refers to an amino acid residue at a position cited in a polypeptide or an amino acid residue similar, identical, or homologous to the residue cited in the polypeptide. Identifying the amino acid at the corresponding position may be determining a specific amino acid in a sequence referring to a specific sequence. As used herein, the "corresponding region" generally refers to a region similar or corresponding thereto in a related protein or a reference protein.

For example, an arbitrary amino acid sequence is aligned with SEQ ID NO: 1 and then each amino acid residue of the amino acid sequence may be numbered with reference to the position of each corresponding amino acid residue of SEQ ID NO: 1. For example, positions of amino acids or positions where substitution, addition, or deletion occurs may be identified using a sequence alignment algorithm as disclosed herein by comparing with a query sequence (also referred to as a "reference sequence").

Such alignment may be conducted using, for example, the Needleman-Wunsch algorithm (Needleman and Wunsch, 1970, *J. Mol. Biol.* 48:443-453) or the Needleman program of the EMBOSS package (EMBOSS: The European Molecular Biology Open Software Suite, Rice et al., 2000, *Trends Genet.* 16:276-277), but the present disclosure is not limited thereto, and any sequence alignment programs and pairwise sequence comparison algorithms well known in the art may be appropriately used.

Since an amino acid at a specific position of the L-threonine dehydratase is substituted as described above, the L-threonine dehydratase variant provided herein has increased production of L-isoleucine, resulting in enhancement of L-isoleucine producing capability compared to the protein before modification.

The L-threonine dehydratase variant in which the amino acid corresponding to the 381$^{st}$ position of the amino acid sequence of SEQ ID NO: 1 is substituted with a different amino acid may include one of amino acid sequences of SEQ ID NOS: 3 to 10, specifically may consist essentially of one of the amino acid sequences of SEQ ID NOS: 3 to 10, and more specifically be formed of one of the amino acid sequences of SEQ ID NOS: 3 to 10, without being limited thereto. The amino acid sequences of SEQ ID NOS: 3 to 10 may be those obtained by substituting the amino acid corresponding to the 381$^{st}$ position of the amino acid sequence of SEQ ID NO: 1 with alanine, serine, proline, glutamine, valine, isoleucine, glycine, or methionine, without being limited thereto.

In addition, the variant may include one of the amino acid sequences of SEQ ID NOS: 3 to 10 or an amino acid sequence having a homology or identity of 80% or more therewith, in which the amino acid corresponding to the 381$^{st}$ position is fixed, without being limited thereto. Specifically, the variant of the present disclosure may include a polypeptide having at least 80%, 90%, 95%, 96%, 97%, 98%, or 99% homology or identity with one of the amino acid sequences of SEQ ID NOS: 3 to 10. In addition, it is obvious that any protein having the amino acid sequence including deletion, modification, substitution, or addition of one or several amino acids at a position other than the 381$^{st}$ position may be included within the scope of the present disclosure as long as the protein has such as homology or identity and effects equivalent to those of the protein.

In addition, in the L-threonine dehydratase variant in which the amino acid corresponding to the 381$^{st}$ position of the amino acid sequence of SEQ ID NO: 1 is substituted with a different amino acid, an amino acid corresponding to the 383$^{rd}$ position of the amino acid sequence of SEQ ID NO: 1 may be further substituted with a different amino acid. The L-threonine dehydratase variant in which i) the amino acid corresponding to the 381$^{st}$ position is substituted with a different amino acid, and/or ii) the amino acid corresponding to the 383$^{rd}$ position is further substituted with a different amino acid in the amino acid sequence of SEQ ID NO: 1 may include one of the amino acid sequences of SEQ ID NOS: 23 to 30; consist essentially of one of the amino acid sequences of SEQ ID NOS: 23 to 30; or be formed of one of the amino acid sequences of SEQ ID NOS: 23 to 30, without being limited thereto. The amino acid sequences of SEQ ID NOS: 23 to 30 may be those in which i) the amino acid corresponding to the 381$^{st}$ position is substituted with alanine, serine, proline, glutamine, valine, isoleucine, glycine, or methionine, and/or ii) the amino acid corresponding to the 383$^{rd}$ position is substituted with alanine in the amino acid sequence of SEQ ID NO: 1, without being limited thereto. Specifically, the variant may be those in which, in the amino acid sequence of SEQ ID NO: 1, a) i) the amino acid corresponding to the 381$^{st}$ position is substituted with alanine, and/or ii) the amino acid corresponding to the 383$^{rd}$ position is substituted with alanine; b) i) the amino acid corresponding to the 381$^{st}$ position is substituted with serine, and/or ii) the amino acid corresponding to the 383$^{rd}$ position is substituted with alanine; c) i) the amino acid corresponding to the 381$^{st}$ position is substituted with proline, and/or ii) the amino acid corresponding to the 383$^{rd}$ position is substituted with alanine; d) i) the amino acid corresponding to the 381$^{st}$ position is substituted with glutamine, and/or ii) the amino acid corresponding to the 383$^{rd}$ position is substituted with alanine; e) i) the amino acid corresponding to the 381$^{st}$ position is substituted with valine, and/or ii) the amino acid corresponding to the 383$^{rd}$ position is substituted with alanine; f) i) the amino acid corresponding to the 381$^{st}$ position is substituted with isoleucine, and/or ii) the amino acid corresponding to the 383$^{rd}$ position is substituted with alanine; g) i) the amino acid corresponding to the 381$^{st}$ position is substituted with glycine, and/or ii) the amino acid corresponding to the 383$^{rd}$ position is substituted with alanine; or h) i) the amino acid corresponding to the 381$^{st}$ position is substituted with methionine, and/or ii) the amino acid corresponding to the 383$^{rd}$ position is substituted with alanine, without being limited thereto.

In addition, the variant may include one of the amino acid sequences of SEQ ID NOS: 23 to 30 or an amino acid sequence having a homology or identity of 80% or more therewith, in which at least one amino acid selected from the amino acids corresponding to the 381$^{st}$ position and/or the 383$^{rd}$ position is fixed, without being limited thereto. Specifically, the variant of the present disclosure may include a polypeptide having at least 80%, 90%, 95%, 96%, 97%, 98%, or 99% homology or identity with one of the amino acid sequences of SEQ ID NOS: 23 to 30. In addition, it is obvious that any protein having the amino acid sequence including deletion, modification, substitution, or addition of one or several amino acids at a position other than the 381$^{st}$ position and the 383$^{rd}$ position may be included within the scope of the present disclosure as long as the protein has such as homology or identity with and effects equivalent to those of the protein.

As used herein, the term "homology" or "identity" refers to relatedness between two amino acid sequences or nucleotide sequences and may be expressed as a percentage. The terms homology and identity may often be used interchangeably.

Sequence homology or identity of conserved polynucleotides or polypeptides may be determined using a standard alignment algorithm, and default gap penalties established by a program may be used together therewith. Substantially, homologous or identical sequences may generally hybridize with each other in whole or in part under moderately or highly stringent conditions. It is obvious that hybridization includes hybridization of a polynucleotide with a polynucleotide including a general codon or a codon in consideration of codon degeneracy.

The homology, similarity, or identity between two polynucleotide or polypeptide sequences may be determined using any computer algorithm known in the art, e.g., the "FASTA" program, using default parameters introduced by Pearson et al. (1988) *Proc. Natl. Acad. Sci. USA* 85:2444. Alternatively, the homology, similarity, or identity may be determined using the Needleman-Wunsch algorithm (Needleman and Wunsch, 1970, *J. Mol. Biol.* 48:443-453) as implemented in the Needleman program of the EMBOSS package (EMBOSS: The European Molecular Biology Open Software Suite, Rice et al., 2000, *Trends Genet.* 16:276-277) (version 5.0.0 or later) (including the GCG program package (Devereux, J. et al., *Nucleic Acids Research* 12:387 (1984)), BLASTP, BLASTN, FASTA (Atschul, S. F. et al., *J MOLEC BIOL* 215:403 (1990); *Guide to Huge Computers*, Martin J. Bishop, ed., Academic Press, San Diego, 1994; and CARILLO et al. (1988) *SIAM J Applied Math* 48:1073). For example, the homology, similarity, or identity may be determined using BLAST, from the National Center for Biotechnology Information database, or ClustalW.

The homology, similarity, or identity between polynucleotides or polypeptides may be determined by comparing sequence information using the GAP computer program as introduced by Needleman et al., (1970), *J Mol Biol.* 48:443 as disclosed by Smith and Waterman, *Adv. Appl. Math* (1981) 2:482. Briefly, the GAP program defines similarity as the number of aligned symbols (i.e., nucleotides or amino acids) which are similar, divided by the total number of symbols in a shorter of two sequences. Default parameters for the GAP program may include: (1) a binary comparison matrix (containing a value of 1 for identities and 0 for non identifies) and the weighted comparison matrix of Gribskov, et al. (1986), *Nucl. Acids Res.* 14:6745 as described by Schwartz and Dayhoff, eds., *Atlas Of Protein Sequence and Structure*, National Biomedical Research Foundation, pp. 353-358 (1979) (or EDNAFULL (EMBOSS version of NCBI NUC4.4) substitution matrix); (2) a penalty of 3.0 for each gap and an additional 0.10 penalty for each symbol in each gap (or a gap open penalty of 10 and a gap extension penalty of 0.5); and (3) no penalty for end gaps.

Another aspect of the present disclosure provides a polynucleotide encoding the L-threonine dehydratase variant of the present disclosure.

The amino acid sequence of SEQ ID NO: 1, L-threonine dehydratase, and variant thereof are as described above.

As used herein, the term "polynucleotide" refers to a DNA or RNA strand having a certain minimum length as a polymer of nucleotides in which nucleotide monomers are linked to each other in the form of a long chain by covalent bonds. In the present disclosure, the polynucleotide may refer to a polynucleotide fragment encoding the L-threonine dehydratase variant of the present disclosure.

The polynucleotide may include any nucleotide sequences encoding the L-threonine dehydratase variant of the present disclosure without limitation. In the present disclosure, a gene encoding the amino acid sequence of L-threonine dehydratase is ilvA gene, and the gene may be derived specifically from *Corynebacterium glutamicum*, without being limited thereto.

Specifically, the polynucleotide encoding the L-threonine dehydratase variant of the present disclosure may include a base sequence encoding the L-threonine dehydratase variant in which the amino acid corresponding to the 381$^{st}$ position of the amino acid sequence of SEQ ID NO: 1 is substituted with a different amino acid.

The polynucleotide may include various modifications made in a coding region provided not to change the amino acid sequence of the polypeptide expressed from the coding region due to codon degeneracy or in consideration of a codon preferred by a living organism in which the polypeptide is to be expressed. Any nucleotide sequence encoding the L-threonine dehydratase variant in which the amino acids corresponding to the 381$^{st}$ position of SEQ ID NO: 1 is substituted with a different amino acid may be included therein without limitation.

In addition, the polynucleotide may include any probe prepared from any known gene sequences, e.g., a nucleotide sequence hybridized with a sequence totally or partially complementary to the above-described nucleotide sequence under stringent conditions, without limitation. The term "stringent conditions" refers to conditions allowing specific hybridization between polynucleotides. Such conditions are disclosed in detail in known documents (For example, J. Sambrook et al., *Molecular Cloning, A Laboratory Manual*, 2$^{nd}$ Edition, Cold Spring Harbor Laboratory press, Cold Spring Harbor, New York, 1989; F. M. Ausubel et al., *Current Protocols in Molecular Biology*, John Wiley & Sons, Inc., New York, 9.50-9.51, 11.7-11.8). For example, the stringent conditions may include performing hybridization between polynucleotides having a high homology or identity, e.g., a homology or identity of 70% or more, 75% or more, 80% or more, 85% or more, 90% or more, 95% or more, 96% or more, 97% or more, 98% or more, or 99% or more, without performing hybridization between polynucleotides having a homology or identity lower than the above homologies or identities, or washing once, specifically twice or three times, under conventional washing conditions for Southern hybridization at a salt concentration and temperature of 60° C., 1×SSC, and 0.1% SDS, specifically 60° C., 0.1×SSC, 0.1% SDS, and more specifically 68° C., 0.1× SSC, and 0.1% SDS.

Hybridization requires that two nucleic acids have complementary sequences, although bases may mismatch according to the degree of stringency of hybridization. The term "complementary" is used to describe the relationship between bases of nucleotides capable of hybridizing with each other. For example, with respect to DNA, adenosine is complementary to thymine and cytosine is complementary to guanine. Thus, the present disclosure may include not only a substantially similar nucleic acid sequence but also a nucleic acid fragment which is isolated but complementary to the entire sequence.

Specifically, the polynucleotides having homology or identity with the polynucleotide of the present disclosure may be detected using hybridization conditions including a hybridization process at a $T_m$ value of 55° C. and the above-described conditions. Also, the $T_m$ value may be, but is not limited to, 60° C., 63° C., or 65° C., and may be appropriately adjusted by those skilled in the art according to the intended purposes.

An appropriate degree of stringency for hybridization of the polynucleotides may depend on lengths and a degree of complementarity of the polynucleotides, and parameters thereof are well known in the art (e.g., J. Sambrook et al., supra).

In addition, the polynucleotide encoding the L-threonine dehydratase variant of the present disclosure may include a base sequence encoding a L-threonine dehydratase variant in which i) the amino acid corresponding to the $381^{st}$ position is substituted with a different amino acid, and/or ii) the amino acid corresponding to the $383^{rd}$ position is substituted with a different amino acid in the amino acid sequence of SEQ ID NO: 1. The polynucleotide may include any nucleotide sequence encoding a L-threonine dehydratase variant in which at least one amino acid selected from the amino acids corresponding to the $381^{st}$ position and/or the $383^{rd}$ position of the amino acid sequence of SEQ ID NO: 1 is substituted with a different amino acid.

Another aspect of the present disclosure provides a vector including the polynucleotide encoding the L-threonine dehydratase variant of the present disclosure.

The amino acid sequence of SEQ ID NO: 1, L-threonine dehydratase, variant thereof, and polynucleotide are as described above.

As used herein, the term "vector" refers to a DNA construct containing a base sequence of a polynucleotide encoding a target protein and operably linked to a suitable regulatory sequence so as to be able to express the target protein in a suitable host cell. The regulatory sequence may include a promoter capable of initiating transcription, any operator sequence for regulating the transcription, a sequence encoding a suitable mRNA ribosome binding site, and a sequence for regulating termination of transcription and translation. When a suitable host cell is transformed with the vector, the vector may replicate or function independently from the host genome, or may integrate into the genome thereof.

The vector used in the present disclosure is not particularly limited, and any vector known in the art may be used. Examples of conventional vectors may include a natural or recombinant plasmid, cosmid, virus, and bacteriophage. For example, pWE15, M13, MBL3, MBL4, IXII, ASHII, APII, t10, t11, Charon4A, and Charon21A may be used as a phage vector or a cosmid vector. As a plasmid vector, pBR type, pUC type, pBluescriptII type, pGEM type, pTZ type, pCL type, and pET type may be used. Specifically, pDZ, pACYC177, pACYC184, pCL, pECCG117, pUC19, pBR322, pMW118, and pCC1BAC vectors may be used.

For example, a polynucleotide encoding a target polypeptide may be inserted into the chromosome by using a vector for chromosomal insertion into cells. The insertion of the polynucleotide into the chromosome may be performed using any method known in the art, for example, homologous recombination, without being limited thereto. The polynucleotide may further include a selection marker to confirm chromosomal insertion. The selection marker is used to select cells that are transformed with the vector, that is, to confirm insertion of desired nucleic acid molecules, and examples of the selection marker may include markers providing selectable phenotypes, such as drug resistance, nutrient requirement, resistance to cytotoxic agents, or surface expression of a polypeptide. Only cells expressing the selection marker are able to survive or to show different phenotypes under the environment treated with a selective agent, and thus the transformed cells may be selected.

Another aspect of the present disclosure provides an L-isoleucine-producing microorganism including at least one of: the L-threonine dehydratase variant of the present disclosure; a polynucleotide encoding the variant; and a vector including the polynucleotide.

The amino acid sequence of SEQ ID NO: 1, L-threonine dehydratase, variant thereof, polynucleotide, and vector are as described above.

As used herein, the term "L-isoleucine-producing microorganism" includes all of wild-type microorganisms and microorganisms in which natural or artificial genetic modification occurs, and may be a microorganism including genetic modification in order to produce a target protein or product in which a particular mechanism is weakened or enhanced via introduction of a foreign gene or enhancement or inactivation of an endogenous gene.

The L-isoleucine-producing microorganism of the present disclosure may be a microorganism having the ability to produce a target protein or a target product involved in production of the target protein by including at least one of the polypeptide; a polynucleotide encoding the same; and a vector including the polynucleotide, without being limited thereto. The microorganism may be a microorganism naturally having the ability to produce a target protein or a target product or a microorganism prepared by providing the ability to produce the target protein or the target product to a parent strain unable to produce the target protein or the target product, without being limited thereto. In view of the objects of the present disclosure, the target protein may be a L-threonine dehydratase variant, and the target product may be L-isoleucine.

The L-isoleucine-producing microorganism may be a microorganism genetically modified via at least one of the polypeptide of the present disclosure, a polynucleotide encoding the same, and a vector including the polynucleotide; a microorganism modified to express the polypeptide or a polynucleotide encoding the same; a recombinant microorganism expressing the polypeptide or a polynucleotide encoding the same; or a recombinant microorganism having the activity of the polypeptide, without being limited thereto. In view of the objects of the present disclosure, the L-isoleucine-producing microorganism may refer to a microorganism having enhanced L-isoleucine producing capability by way of introduction of the L-threonine dehydratase variant into a microorganism naturally having weak L-isoleucine producing capability. Specifically, the microorganism may be a microorganism expressing a L-threonine dehydratase variant in which an amino acid corresponding to the 381$^{st}$ position of the amino acid sequence of SEQ ID NO: 1 is substituted with a different amino acid, wherein the L-threonine dehydratase variant may be one in which the amino acid corresponding to the 381$^{st}$ position of the amino acid sequence of SEQ ID NO: 1 is substituted with at least one amino acid selected from the group consisting of alanine, serine, proline, glutamine, valine, isoleucine, glycine, and methionine, without being limited thereto.

In addition, in the L-isoleucine-producing microorganism, the activity of the L-threonine dehydratase increases compared to wild-type or non-modified microorganisms, and thus the ability to produce 2-ketobutyrate, as a precursor of L-isoleucine, is enhanced, resulting in enhancement of L-isoleucine producing capability. Wild-type or non-modified microorganisms cannot produce or may produce trace amounts of L-isoleucine. In contrast, it is significant that production of L-isoleucine may increase due to an increase in the production of the precursor of L-isoleucine via introduction of the L-threonine dehydratase variant of the present disclosure.

As used herein, the term "non-modified microorganism" does not exclude strains including mutations naturally occurring in microorganisms, and may refer to a wild-type strain or a natural-type strain, or a strain before being transformed due to a natural or artificial factor. The term "non-modified microorganism" may be used interchangeably with "pre-modified strain", "pre-modified microorganism", "non-mutated strain", "non-modified strain", "non-mutated microorganism", or "reference microorganism".

In addition, the L-isoleucine-producing microorganism of the present disclosure may express not only the L-threonine dehydratase variant in which the amino acid corresponding to the 381$^{st}$ position of the amino acid sequence of SEQ ID NO: 1 is substituted with a different amino acid, but also the L-threonine dehydratase variant in which the amino acid corresponding to the 383$^{rd}$ position of the amino acid sequence of SEQ ID NO: 1 is further substituted with a different amino acid. The L-isoleucine-producing microorganism of the present disclosure may specifically be a microorganism expressing the L-threonine dehydratase variant in which i) the amino acid corresponding to the 381$^{st}$ position is substituted with a different amino acid, and/or ii) the amino acid corresponding to the 383$^{rd}$ position is substituted with a different amino acid, in the amino acid sequence of SEQ ID NO: 1, more specifically a microorganism expressing the L-threonine dehydratase variant in which i) the amino acid corresponding to the 381$^{st}$ position is substituted with at least one amino acid selected from the group consisting of alanine, serine, proline, glutamine, valine, isoleucine, glycine, and methionine, and/or ii) the amino acid corresponding to the 383$^{rd}$ position is substituted with alanine, in the amino acid sequence of SEQ ID NO: 1, without being limited thereto.

As used herein, a protein "to be expressed/being expressed" means a state in which a target protein is introduced into or expressed in a microorganism. When the target protein is a protein present in the microorganism, the activity of the protein is enhanced compared to the intrinsic activity or that of the protein before modification. In view of the objects of the present disclosure, the "target protein" may be the above-described L-threonine dehydratase variant. Specifically, the term "introduction of a protein" refers to providing activity of a particular protein to a microorganism which does not possess the protein or enhancing the activity of the protein compared to the intrinsic activity of the protein or the activity before modification. For example, the introduction of a protein may refer to introduction of a polynucleotide encoding a particular protein into a chromosome or introduction of a vector including the polynucleotide encoding the particular protein into a microorganism to thereby express the activity of the protein.

As used herein, the "enhancement" of the activity of a polypeptide may mean that the activity of the polypeptide is increased when compared with the intrinsic activity. The term "enhancement" may be used interchangeably with activation, up-regulation, overexpression, and increase. In this regard, the activation, up-regulation, overexpression, and increase may include of all exhibition of an activity that was not originally possessed or exhibition of improved activity compared to intrinsic activity or activity before modification. The "intrinsic activity" refers to activity of a particular polypeptide possessed by a parent strain or a non-modified microorganism before transformation when the transformation is caused by modification by a natural or artificial factor. This term may be used interchangeably with "activity before modification". The "enhancement", "up-regulation", "overexpression", or "increase" of the activity of the polypeptide compared to intrinsic activity means that activity and/or concentration (expression level) of a particular polypeptide is increased compared to those of a parent strain or non-modified microorganism before transformation.

The enhancement may be achieved via introduction of a foreign polypeptide or enhancement of intrinsic activity and/or concentration (expression level) of the polypeptide. The enhancement of the activity of the polypeptide may be confirmed based on the degree of activity of the polypeptide or an increase in an amount of a product released from the polypeptide.

Enhancement of the activity of the polypeptide may be achieved by applying any method well known in the art without limitation, as long as the activity of the target polypeptide is enhanced compared to that of the microorganism before modification. Specifically, any genetic engineering and/or protein engineering methods well known in the art as common methods of the molecular biology may be used, without being limited thereto (For example, Sitnicka et al. Functional Analysis of Genes. *Advances in Cell Biology.* 2010, Vol. 2. 1-16; Sambrook et al. *Molecular Cloning* 2012; etc.).

Specifically, the enhancement of the polypeptide of the present disclosure may be achieved by:
  (1) increasing the copy number of a polynucleotide encoding the polypeptide;
  (2) replacing a gene expression regulatory region on the chromosome encoding the polypeptide with a sequence with stronger activity;
  (3) modifying a base sequence encoding an initiation codon or a 5'-UTR region of a gene transcript encoding the polypeptide;
  (4) modifying an amino acid sequence of the polypeptide to enhance the activity of the polypeptide;
  (5) modifying a nucleotide sequence encoding the polypeptide to enhance the activity of the polypeptide (e.g., modifying a nucleotide sequence of a gene of the polypeptide to encode a polypeptide modified to have enhanced activity);
  (6) introducing a foreign polypeptide having the activity of the polypeptide or a foreign polynucleotide encoding the same;
  (7) optimizing a codon of a polynucleotide encoding the polypeptide;

(8) modifying or chemically modifying an exposed region selected by analyzing a three-dimensional structure of the polypeptide; or (9) any combination of two or more selected from (1) to (8) above, without being limited thereto.

More specifically, the increase in the copy number of the polynucleotide encoding the polypeptide described in (1) above is achieved by introduction of a vector, which replicates and functions irrespective of a host cell and is operably linked to the polynucleotide encoding the polypeptide, into a host cell. Alternatively, the increase in the copy number may be achieved by introducing one copy or two or more copies of the polynucleotide encoding the polypeptide into the chromosomes of the host cell. Introduction into the chromosome may be performed using a vector capable of inserting the polynucleotide into the chromosome in the host cell, without being limited thereto. The vector is as described above.

The replacement of a gene expression regulatory region (or expression regulatory sequence) on the chromosome encoding the polypeptide with a sequence with stronger activity described in (2) above may be achieved by inducing mutation in the sequence by deletion, insertion, non-conservative or conservative substitution, or any combination thereof or by replacing the sequence with a sequence with stronger activity, to further enhance the activity of the expression regulatory region. The expression regulatory region may include a promoter, an operator sequence, a ribosome binding site-encoding sequence, and a sequence for regulating termination of transcription and translation, without being limited thereto. For example, the replacement may be replacement of an intrinsic promoter with a stronger promoter, without being limited thereto.

Examples of the stronger promoter may include CJ1 to CJ7 promoters (U.S. Pat. No. 7,662,943 B2), a lac promoter, a trp promoter, a trc promoter, a tac promoter, a Lambda phage PR promoter, a PL promoter, a tet promoter, a gapA promoter, an SPL7 promoter, an SPL13 promoter (sm3, U.S. Pat. No. 10,584,338 B2), an O2 promoter (U.S. Pat. No. 10,273,491 B2), a tkt promoter, and a yccA promoter, without being limited thereto.

The modification of a base sequence encoding an initiation codon or a 5'-UTR region of a gene transcript encoding the polypeptide described in (3) above may be achieved by, for example, substituting the base sequence encoding the intrinsic initiation codon with another base sequence encoding an initiation codon with a higher expression level of the polypeptide, without being limited thereto.

The modification of the amino acid sequence or the nucleotide sequence described in (4) and (5) above may be conducted by inducing mutation in the amino acid sequence of the polypeptide or in the nucleotide sequence encoding the polypeptide by deletion, insertion, non-conservative or conservative substitution, or any combination thereof to further enhance the activity of the polypeptide, or by replacing the amino acid sequence or the nucleotide sequence with an amino acid sequence or a nucleotide sequence modified to have stronger activity, without being limited thereto. Specifically, the replacement may be performed by inserting the polynucleotide into the chromosome via homologous recombination, without being limited thereto. A vector used herein may further include a selection marker to identify insertion into the chromosome. The selection marker is as described above.

The introduction of a foreign polynucleotide having the activity of the polypeptide described in (6) above may be achieved by introducing a foreign polynucleotide encoding a polypeptide having activity identical/similar to that of the polypeptide into a host cell. The origin or sequence of the foreign polynucleotide is not particularly limited as long as the foreign polynucleotide exhibits activity identical/similar to that of the polypeptide. A method used in the introduction may be appropriately selected by those of ordinary skill in the art. As the introduced polynucleotide is expressed in the host cell, the polypeptide is produced, and the activity thereof may be enhanced.

The codon optimization of the polynucleotide encoding the polypeptide described in (7) above may be achieved by optimizing a codon to increase transcription or translation of an intrinsic polynucleotide in a host cell or by optimizing a codon to allow optimized transcription or translation of a foreign polynucleotide in a host cell.

The modification or chemical modification of an exposed region selected by analyzing a three-dimensional structure of the polypeptide described in (8) above may be achieved by determining a template protein candidate according to similarity between sequences based on comparison between information on a sequence of the polypeptide to be analyzed and a database that stores information on sequences of existing proteins, identifying the structure based thereon, selecting an exposed region to be modified or chemically modified, and modifying or chemically modifying the exposed region.

The enhancement of the activity of the polypeptide as described above may be an increase in the activity or concentration (expression level) of the polypeptide compared with the activity or concentration of the polypeptide expressed in the wild-type or non-modified microorganism strains or an increase in an amount of a product obtained from the polypeptide, without being limited thereto.

In the microorganism of the present disclosure, modification of the polynucleotide in whole or in part may be induced by (a) homologous recombination using a vector for chromosomal insertion into the microorganism or genome editing using genetic scissors (engineered nuclease, e.g., CRISPR-Cas9) and/or (b) treatment with light such as UV light and radiation and/or chemicals, without being limited thereto. Methods for modification of the gene in whole or in part may include DNA recombination. For example, deletion of the gene in whole or in part may occur by inducing homologous recombination by inserting a nucleotide sequence or vector including a homologous nucleotide sequence with a target gene. The inserted nucleotide sequence or vector may include a dominant selection marker, without being limited thereto.

The enhancement of the activity of the polypeptide or protein as described above may be an increase in the activity or concentration of the polypeptide or protein compared with the activity or concentration of the polypeptide or protein expressed in the wild-type or non-modified microorganism strains or an increase in an amount of a product obtained from the polypeptide or protein, without being limited thereto.

The microorganism including the L-threonine dehydratase variant may be a recombinant microorganism, and recombination may be performed by genetic modification such as transformation. Specifically, the microorganism of the present disclosure may be a recombinant microorganism transformed with a vector including a polynucleotide encoding the L-threonine dehydratase variant, without being limited thereto.

As used herein, the term "transformation" refers to a process of introducing the vector including the polynucleotide encoding the target protein into a host cell in such a way that the protein encoded by the polynucleotide is expressed in the host cell. The transformed polynucleotide may be either in a form inserted into the chromosome of the host cell or in a form located outside the chromosome as long as the protein is expressed in the host cell. In addition, the polynucleotide includes DNA and RNA encoding the target protein. The polynucleotide may be introduced into the host cell in any form as long as the polynucleotide is introduced into the host cell and the protein is expressed therein. For example, the polynucleotide may be introduced into the host cell in the form of an expression cassette, which is a gene construct including all of the essential elements required for self-replication. The expression cassette may generally include a promoter operably linked to the polynucleotide, a transcription termination signal, a ribosome binding site, and a translation termination signal. The expression cassette may be in the form of a self-replicable expression vector. Also, the polynucleotide may be introduced into the host cell in its original form and operably linked to a sequence required for the expression in the host cell, without being limited thereto.

In addition, as used herein, the term "operably linked" means a functional linkage between a nucleotide sequence encoding the polypeptide of the present disclosure and a promoter sequence which initiates and mediates transcription of the nucleotide sequence.

Methods for the transformation according to the present disclosure include any methods enabling introduction of a nucleic acid into the host cell, and may be performed by suitable standard techniques well known in the art selected according to the host cell. For example, electroporation, calcium phosphate ($CaPO_4$) precipitation, calcium chloride ($CaCl_2$) precipitation, microinjection, a polyethylene glycol (PEG) method, a DEAE-dextran method, a cationic liposome method, and a lithium acetate-DMSO method may be used, but the present disclosure is not limited thereto.

Types of the L-isoleucine-producing microorganism are not particularly limited as long as the microorganism produces L-isoleucine, and examples of the L-isoleucine-producing microorganism may include microorganisms belonging to the genus *Corynebacterium*, the genus *Escherichia*, the genus *Enterobacter*, the genus *Erwinia*, the genus *Serratia*, the genus *Providencia*, and the genus *Brevibacterium*, specifically microorganisms belonging the genus *Corynebacterium*.

As used herein, the "microorganism belonging to the genus *Corynebacterium*" may include all microorganisms belonging to the genus *Corynebacterium*. Specifically, the microorganism may be *Corynebacterium glutamicum, Corynebacterium crudilactis, Corynebacterium deserti, Corynebacterium efficiens, Corynebacterium callunae, Corynebacterium stationis, Corynebacterium singulare, Corynebacterium halotolerans, Corynebacterium striatum, Corynebacterium ammoniagenes, Corynebacterium pollutisoli, Corynebacterium imitans, Corynebacterium testudinoris*, or *Corynebacterium flavescens*, more specifically *Corynebacterium glutamicum*.

In the present disclosure, a parent strain of the microorganism may be a microorganism in which a biosynthesis pathway of L-isoleucine is further enhanced to increase production of L-isoleucine, without being limited thereto.

Specifically, the microorganism may be a microorganism in which a genetic mutation (R407H) is further introduced into hom gene encoding homoserine dehydrogenase (U.S. Patent Application Publication No. US 2020-0340022 A1) or a microorganism in which genetic mutation (L377K) is further introduced into lysC gene encoding aspartokinase (U.S. Pat. No. 10,662,450 B2) to enhance the biosynthesis pathway of L-isoleucine, for example, to relieve feedback inhibition of threonine, which is a precursor of isoleucine. However, the present disclosure is not limited thereto, and the production of L-isoleucine may be increased using any method of regulating gene expression that is well known in the art.

As used herein, the term "enhancement/increase" is a concept including an increase in the activity compared to the intrinsic activity.

The enhancement or increase of gene activity may be achieved by application of various methods well known in the art. Examples of the methods may include at least one selected from the group consisting of: a method of increasing the copy number of a gene; a method of introducing mutation into an expression regulatory sequence of the gene; a method of replacing the expression regulatory sequence of the gene with a sequence having stronger activity; a method of additionally introducing mutation into the gene in order to enhance the activity of the gene; a method of introducing a foreign gene into a microorganism; and any combination thereof, without being limited thereto.

As another example for increasing production of L-isoleucine, a parent strain of the microorganism of the present disclosure may be a microorganism in which a gene weakening the biosynthesis pathway of L-isoleucine is further inactivated to increase production of L-isoleucine, without being limited thereto.

As used herein, the term "weakening" of the polypeptide is a concept including both reduction and elimination of the activity compared to intrinsic activity. The term weakening may be used interchangeably with inactivation, deficiency, down-regulation, decrease, reduce, and attenuation.

The weakening may include: a case in which the activity of the polypeptide is reduced or eliminated compared to intrinsic activity processed by the microorganism due to mutation of a polynucleotide encoding the polypeptide or the like; a case in which the activity and/or concentration (expression level) of the polypeptide in cells are lower than those of the wild-type strain due to suppressed gene expression of a polynucleotide encoding the same or suppressed translation thereof into the polypeptide; a case in which the polynucleotide is not expressed at all; and/or a case in which no activity of the polypeptide is obtained even though the polynucleotide is expressed. The term "intrinsic activity" refers to activity of a polypeptide originally possessed by a parent strain, wild-type, or non-modified microorganism before transformation when the microorganism is transformed by genetic modification caused by a natural or artificial factor. The intrinsic activity may also be used interchangeably with "activity before modification". The "inactivation, deficiency, down-regulation, decrease, reduce, and attenuation" of the activity of the polypeptide compared to intrinsic activity means lowering of the activity compared to the activity of the polypeptide originally possessed by a parent strain or non-modified microorganism before transformation.

The weakening of the activity of the polypeptide may be performed by, but is not limited to, any method well known in the art, and may be achieved by applying various methods well known in the art (for example, Nakashima N. et al., Bacterial cellular engineering by genome editing and gene silencing. *Int J Mol Sci*. 2014; 15(2):2773-2793; Sambrook et al. *Molecular Cloning* 2012; etc.).

Specifically, the weakening of the polypeptide of the present disclosure may be achieved by:
(1) deleting a gene encoding the polypeptide in whole or in part;
(2) modifying a gene expression regulatory region (or expression regulatory sequence) to reduce expression of the gene encoding the polypeptide;
(3) modifying an amino acid sequence constituting the polypeptide to eliminate or weaken the activity of the polypeptide (e.g., deletion/substitution/addition of at least one amino acid in the amino acid sequence);
(4) modifying a sequence of a gene encoding to the polypeptide to eliminate or weaken the activity of the polypeptide (e.g., deletion/substitution/addition of at least one base of a nucleic acid in a base sequence of the gene of the polypeptide to encode a polypeptide modified to eliminate or weaken the activity of the polypeptide;
(5) modifying a base sequence encoding an initiation codon or a 5'-UTR region of a gene transcript encoding the polypeptide;
(6) introducing an antisense oligonucleotide (e.g., introduction of antisense RNA) complementarily binding to a gene transcript encoding the polypeptide;
(7) adding a sequence complementary to a Shine-Dalgarno sequence of a gene encoding the polypeptide upstream of the Shine-Dalgarno sequence to form a secondary structure making binding of a ribosome impossible;
(8) adding a promoter for reverse transcription to the 3' terminus of the open reading frame (ORF) of a sequence of a gene encoding the polypeptide (reverse transcription engineering, RTE); or
(9) any combination of two or more selected from (1) to (8) above, without being limited thereto.

For example, the deletion of a gene encoding the polypeptide in whole or in part described in (1) above may be achieved by deleting the entire polynucleotide encoding an intrinsic target polypeptide in the chromosome or by replacing the polynucleotide with a polynucleotide in which one or several nucleotides are deleted or with a marker gene.

Also, the modification of a gene expression regulatory region (or expression regulatory sequence) described in (2) above may be achieved by mutation in the expression regulatory region (or expression regulatory sequence) by deletion, insertion, non-conservative or conservative substitution, or any combination thereof or replacement with a sequence having weaker activity. The expression regulatory region includes a promoter, an operator sequence, a ribosome binding site-encoding sequence, and a sequence for regulating termination of transcription and translation, without being limited thereto.

In addition, the modification of the base sequence encoding an initiation codon or a 5'-UTR region of a gene transcript encoding the polypeptide described in (5) above may be achieved by, for example, substituting the base sequence encoding the intrinsic initiation codon with another base sequence encoding an initiation codon with a lower expression level of the polypeptide, without being limited thereto.

In addition, the modification of the amino acid sequence or the nucleotide sequence described in (3) and (4) above may be conducted by inducing mutation in the amino acid sequence of the polypeptide or in the nucleotide sequence encoding the polypeptide by deletion, insertion, non-conservative or conservative substitution, or any combination thereof or by replacing the amino acid sequence or the nucleotide sequence with an amino acid sequence or a nucleotide sequence modified to have weaker activity or not to have the activity to further weaken the activity of the polypeptide, without being limited thereto. For example, expression of the gene may be suppressed or weakened by forming a termination codon by introducing a mutation into the nucleotide sequence, without being limited thereto.

The introduction of an antisense oligonucleotide (e.g., antisense RNA) complementarily binding to a gene transcript encoding the polypeptide described in (6) above may be achieved using a method disclosed in a document (Weintraub, H. et al., Antisense-RNA as a molecular tool for genetic analysis, *Reviews—Trends in Genetics*, Vol. 1(1) 1986).

The addition of a sequence complementary to a Shine-Dalgarno sequence of a gene encoding the polypeptide upstream of the Shine-Dalgarno sequence to form a secondary structure making binding of a ribosome impossible described in (7) above may make mRNA translation impossible or reduce the speed.

The addition of a promoter for reverse transcription to the 3' terminus of the open reading frame (ORF) of a sequence of a gene encoding the polypeptide (reverse transcription engineering, RTE) described in (8) above may weaken the activity by forming an antisense nucleotide complementary to the gene transcript encoding the polypeptide.

In the present disclosure, the parent strain of the microorganism may be the wild-type *Corynebacterium glutamicum* ATCC13032, a microorganism prepared by additionally introducing horn gene (R407H) encoding homoserine dehydrogenase (U.S. Patent Application Publication No. US 2020-0340022 A1) into the ATCC1303 for relieving feedback inhibition of threonine, which is a precursor of isoleucine, a microorganism prepared by additionally introducing lysC(L377K) encoding aspartokinase (U.S. Pat. No. 10,662,450 B2) into the ATCC130, L-isoleucine-producing KCJI-38 strain (KCCM11248P, Korean Patent No. 10-1335789) treated with N-methyl-N'-nitro-N-nitrosoguanidine (NTG), or an ATCC 13032 hom(R407H)/pECCG117-ilvA(F383A) strain prepared by simultaneously introducing hom(R407H) and ilvA(F383A) into the ATCC13032, without being limited thereto.

Another aspect of the present disclosure provides a method of producing L-isoleucine, the method including culturing a microorganism including at least one of: the L-threonine dehydratase variant of the present disclosure; a polynucleotide encoding the variant; and a vector including the polynucleotide, in a culture medium.

The amino acid sequence of SEQ ID NO: 1, L-threonine dehydratase, variant thereof, polynucleotide, vector, and microorganism are as described above.

The microorganism may belong to the genus *Corynebacterium*, and specifically, it may be *Corynebacterium glutamicum*, without being limited thereto. These are as described above.

As used herein, the term "culturing" refers to growing the host cell in an appropriately adjusted environment. A culturing process of the present disclosure may be performed using appropriate culture medium and culture conditions well known in the art. Specifically, the culturing process may be performed using a batch culture method, a continuous culture method, and a fed-batch culture method, without being limited thereto.

As used herein, the term "culture medium" refers to a material in which nutrients required for culturing the microorganism are mixed as main elements and supplies nutrients and growth factors as well as water, which are essential for survival and growth. Specifically, although culture media and other culturing conditions for the microorganism of the present disclosure are not particularly limited as long as the media are commonly used in culturing microorganisms, the microorganism of the present disclosure may be cultured in an ordinary medium containing appropriate carbon sources, nitrogen sources, phosphorus sources, inorganic compounds, amino acids, and/or vitamins under aerobic conditions while adjusting temperature, pH, and the like.

Specifically, the culture medium for strains belonging to the genus *Corynebacterium* is disclosed in a document ("Manual of Methods for General Bacteriology" by the American Society for Bacteriology (Washington D.C., USA, 1981)).

In the present disclosure, as the carbon sources, carbohydrates such as glucose, fructose, sucrose, and maltose; sugar alcohols such as mannitol and sorbitol; organic acids such as pyruvic acid, lactic acid, and citric acid; and amino acids such as glutamic acid, methionine, and lysine may be used, without being limited thereto. In addition, natural organic nutrients such as starch hydrolysates, molasses, blackstrap molasses, rice bran, cassava, sugar cane bagasse, and corn steep liquor may be used, and specifically, carbohydrates such as glucose and sterile pretreated molasses (i.e., molasses converted to reduced sugars) may be used, and suitable amounts of any other carbon sources may also be used without limitation. These carbon sources may be used alone or in a combination of at least two thereof.

As the nitrogen sources, inorganic nitrogen sources such as ammonia, ammonium sulfate, ammonium chloride, ammonium acetate, ammonium phosphate, ammonium carbonate, and ammonium nitrate; and organic nitrogen sources such as amino acids, e.g., glutamic acid, methionine, and glutamine, peptone, NZ-amine, meat extract, yeast extract, malt extract, corn steep liquor, casein hydrolysate, fish or degradation products thereof, and defatted soybean cake or degradation products thereof may be used. These nitrogen sources may be used alone or in a combination of at least two thereof, without being limited thereto.

As the phosphorus sources, monopotassium phosphate, dipotassium phosphate, or sodium-containing salts corresponding thereto may be used. As inorganic compounds, sodium chloride, calcium chloride, iron chloride, magnesium sulfate, iron sulfate, manganese sulfate, calcium carbonate, and the like may be used. Also, amino acids, vitamins, and/or appropriate precursors may be further included. The culture medium and precursors may be added to the culture medium in a batch or continuous process, without being limited thereto.

In the present disclosure, during the culturing process of the microorganism, compounds such as ammonium hydroxide, potassium hydroxide, ammonia, phosphoric acid, and sulfuric acid may be properly added to the cultures in order to adjust the pH of the culture medium. Also, a defoaming agent such as a fatty acid polyglycol ester may be added during culturing in order to inhibit formation of foams. In addition, oxygen or oxygen-containing gas may be injected into the culture medium to maintain the culture medium in an aerobic condition, and nitrogen, hydrogen, or carbon dioxide gases may be injected into the cultures to maintain the culture in anaerobic and micro-aerobic conditions without injecting any other gases therefor.

The temperature of the culture medium may be maintained at 25° C. to 50° C., more specifically at 30° C. to 37° C., without being limited thereto. The culturing may be continued until a desired amount of a product is obtained, specifically for 10 hours to 100 hours, without being limited thereto.

The L-isoleucine produced by way of the culturing may be released into the culture medium or remain in the cells.

The method of producing L-isoleucine according to the present disclosure may further include recovering L-isoleucine from the culture medium or the microorganism.

L-Isoleucine may be recovered by collecting L-isoleucine from the culture solution using any known method selected according to the culturing method. For example, L-isoleucine may be recovered by centrifugation, filtration, anion-exchange chromatography, treatment with crystallized protein precipitating agent (salt-out method), extraction, ultrasonic destruction, ultrafiltration, dialysis, various chromatography methods such as molecular-sieve chromatography (gel filtration), adsorption chromatography, ion-exchange chromatography, and affinity chromatography, HPLC and any combination thereof, and L-isoleucine may be recovered from the culture medium or the microorganism using any suitable method well known in the art.

The method may further include a purification process. The purification process may be performed using any appropriate method well known in the art to purify the recovered L-isoleucine. Thus, the recovered L-isoleucine may be in a purified form or a fermentation broth of the microorganism including a target product (*Introduction to Biotechnology and Genetic Engineering*, A. J. Nair, 2008).

Another aspect of the present disclosure provides a composition for producing L-isoleucine including a microorganism including at least one of: the L-threonine dehydratase variant; a polynucleotide encoding the variant; and a vector including the polynucleotide, or cultures of the microorganism.

The amino acid sequence of SEQ ID NO: 1, L-threonine dehydratase, variant thereof, polynucleotide, vector, and microorganism are as described above.

The microorganism may belong to the genus *Corynebacterium*, and specifically, it may be *Corynebacterium glutamicum*, without being limited thereto. These are as described above.

The composition for producing L-isoleucine may refer to a composition capable of producing L-isoleucine by way of the L-threonine dehydratase variant of the present disclosure. The composition may include the L-threonine dehydratase variant or elements capable of operating the L-threonine dehydratase variant, without limitation. The L-threonine dehydratase variant may be in a form included in a vector to express a gene operably linked thereto in a host cell.

The composition may further include a cryoprotectant or excipient. The cryoprotectant or excipient may be a substance which is not naturally occurring or a naturally occurring substance, without being limited thereto. As another specific example, the cryoprotectant or excipient may be a substance that does not naturally contact the microorganism or a substance that is not simultaneously included with the microorganism, without being limited thereto.

MODE FOR INVENTION

Hereinafter, the present disclosure will be described in more detail with reference to the following examples. However, the following examples are merely presented to exemplify the present disclosure, and the scope of the present disclosure is not limited thereto.

Example 1: Preparation of ilvA Variant (F383A) Plasmid Having L-Threonine Dehydratase Activity In order to obtain a variant of the microorganism having enhanced L-isoleucine producing capability, mutation was induced in the microorganism according to the following method.

In order to amplify a gene encoding L-threonine dehydratase (TD), ilvA gene (SEQ ID NO: 2), a BamHI restriction enzyme site was inserted into both ends of primer (SEQ ID NOS: 11 and 12) for amplification from a promoter region (about 300 bp upstream from an initiation codon) to a terminator region (about 100 bp downstream from a termination codon) based on a reported ilvA sequence introduced with F383A mutation (*World J Microbiol Biotechnol* (2015) 31:1369-1377). Also, primers (SEQ ID NOS: 13 and 14) were used to introduce F383A mutation into the ilvA gene. Sequences of the primers used herein are listed in Table 1 below.

TABLE 1

| SEQ ID NO: | Name | Sequence |
|---|---|---|
| 11 | primer 1 | ggatccGACTGAGCCTGGGCAACTGG |
| 12 | primer 2 | ggatccCCGTCACCGACACCTCCACA |
| 13 | primer 3 | ACATCACGCTGgcaGAGTACCTCAA |
| 14 | primer 4 | TTGAGGTACTCtgcCAGCGTGATGT |

PCR was performed using a chromosome of wild-type *Corynebacterium glutamicum* ATCC 13032 as a template and primers of SEQ ID NOS: 11 and 14 and SEQ ID NOS: 12 and 13. The PCR was performed under the following conditions. After denaturation at 95° C. for 5 minutes, cycles of denaturation at 95° C. for 30 seconds, annealing at 55° C. for 30 seconds, and polymerization at 72° C. for 90 seconds were repeated 30 times, and then polymerization was performed at 72° C. for 5 minutes.

As a result, a DNA fragment of a 1460 bp 5' upstream region and a DNA fragment of a 276 bp 3' downstream region with respect to the mutation of the ilvA gene were obtained.

PCR was performed using the two amplified DNA fragments as templates and primers of SEQ ID NOS: 11 and 12.

As a result, a DNA fragment of 1531 bp including ilvA mutation (SEQ ID NO: 7) in which phenylalanine at the $383^{rd}$ position was substituted with alanine was amplified. The pECCG117 (Korean Patent No. 10-0057684) vector and the ilvA DNA fragment were treated with BamHI restriction enzyme and ligated with a DNA ligase, followed by cloning to obtain a plasmid named pECCG117-ilvA (F383A).

Example 2: Preparation of ilvA Variant Plasmid Having L-Threonine Dehydratase Activity In order to obtain a variant of a gene encoding L-threonine dehydratase, an ilvA variant gene plasmid was prepared using a random mutagenesis kit (Agilent Technologies, USA). PCR was performed using the ilvA(F383A) chromosome of Example 1 as a template and primers of SEQ ID NOS: 11 and 12. The PCR was performed under the following conditions. After denaturation at 95° C. for 2 minutes, cycles of denaturation at 95° C. for 30 seconds, annealing at 55° C. for 30 seconds, and polymerization at 72° C. for 90 seconds were repeated 30 times, and then polymerization was performed at 72° C. for 10 minutes.

As a result, a DNA fragment of 1531 bp including ilvA mutation capable of encoding L-threonine dehydratase having additional random mutation in addition to the mutation in which the phenylalanine at the $383^{rd}$ position was substituted with alanine was amplified. The pECCG117 vector and the ilvA-mutated DNA fragment were treated with BamHI restriction enzyme and ligated with a DNA ligase, followed by cloning to obtain a plasmid.

Example 3: Preparation and Evaluation of Strain Belonging to the Genus *Corynebacterium* with L-Isoleucine Producing Capability An L-isoleucine-producing strain was prepared using the wild-type *Corynebacterium glutamicum* ATCC13032. Specifically, in order to relieve feedback inhibition of threonine, which is a precursor of isoleucine in the biosynthesis pathway of L-isoleucine, arginine at the $407^{th}$ position of hom gene encoding homoserine dehydrogenase was substituted with histidine (U.S. Patent Application Publication No. US 2020-0340022 A1, SEQ ID NO: 17).

More specifically, in order to prepare strains introduced with hom mutation (R407H), PCR was performed using the chromosome of *Corynebacterium glutamicum* ATCC13032 as a template and primers of SEQ ID NOS: 18 and 19 or SEQ ID NOS: 20 and 21, respectively. Sequences of the primers used herein are listed in Table 2 below.

TABLE 2

| SEQ ID NO: | Name | Sequence |
|---|---|---|
| 18 | primer 5 | TCGAGCTCGGTACCCCGCTTTTGCACTCATCGAGC |
| 19 | primer 6 | CACGATCAGATGTGCATCATCAT |
| 20 | primer 7 | ATGATGATGCACATCTGATCGTG |
| 21 | primer 8 | CTCTAGAGGATCCCCGAGCATCTTCCAAAACCTTG |

As a polymerase for PCR, a PfuUltra™ high-reliability DNA polymerase (Stratagene) was used, and the PCR conditions included denaturation at 95° C. for 30 seconds, annealing at 55° C. for 30 seconds, and 28 repetitions of polymerization at 72° C. for 1 minute.

As a result, a DNA fragment of a 1000 bp 5' upstream region and a DNA fragment of a 1000 bp 3' downstream region with respect to the mutation of the hom gene were obtained.

PCR was performed using the two amplified DNA fragments as templates and primers of SEQ ID NOS: 18 and 21. The PCR was performed under the following conditions. After denaturation at 95° C. for 2 minutes, cycles of denaturation at 95° C. for 30 seconds, annealing at 55° C. for 30 seconds, and polymerization at 72° C. for 2 minutes were repeated 28 times, and then polymerization was performed at 72° C. for 5 minutes.

As a result, a DNA fragment of 2 kb including mutation in the hom gene encoding the homoserine dehydrogenase variant in which arginine at the $407^{th}$ position was substituted with histidine was amplified. The amplified product was purified using a PCR purification kit (QUIAGEN) and used as a DNA fragment to be inserted for preparation of a vector. After the purified amplification product was treated with smaI restriction enzyme, a pDZ vector (U.S. Pat. No. 9,109,242 B2) heat-treated at 65° C. for 20 minutes and the DNA fragment, as the amplification product, were mixed in a molar ratio (M) of 1:2 and cloned in accordance with manuals provided in an infusion cloning kit (TaKaRa) to prepare a pDZ-R407H vector for introduction of horn mutation (R407H) into the chromosome.

*Corynebacterium glutamicum* ATCC13032 was transformed with the prepared vector by electroporation and subjected to a second crossover process to obtain a strain including horn mutation (R407H) on the chromosome, and the strain was named *Corynebacterium glutamicum* ATCC13032 hom(R407H).

Example 4: Evaluation of L-Isoleucine Producing Capability of ilvA Variant-Introduced L-Isoleucine-Producing Strain Strains were prepared according to the following method to identify L-isoleucine productivity of the variant obtained in Example 2. Specifically, the plasmid prepared in Example 1 was introduced into the *Corynebacterium glutamicum* ATCC 13032 hom(R407H) strain prepared in Example 3, and the prepared strain introduced with the plasmid was named ATCC13032 hom(R407H)/pECCG117-ilvA (F383A). In addition, the variant plasmid obtained in Example 2 was introduced into the *Corynebacterium glutamicum* ATCC13032 hom(R407H) strain, and an apoptosis rate measured after smearing the strain on a minimum medium was 70%. Surviving cells were inoculated onto and cultured in a seed medium to select a strain having superior isoleucine producing capability compared to that of the ATCC13032 hom(R407H)/pECCG117-ilvA(F383A) control, and the selected strain was named *Corynebacterium glutamicum* CJILE-301.

The strain was inoculated onto a 250 mL corner-baffle flask containing 25 mL of an isoleucine production medium and cultured at 32° C. for 60 hours while shaking at 200 rpm to prepare L-isoleucine. A composition of a production medium used herein is described below.

<Seed Medium>

5% glucose, 1% bacto-peptone, 0.25% sodium chloride, 1% yeast extract, 0.4% urea, and pH 7.2

<Minimum Medium>

1.0% glucose, 0.4% ammonium sulfate, 0.04% magnesium sulfate, 0.1% monopotassium phosphate, 0.1% urea, 0.001% thiamine, 200 µg/L biotin, 2% agar, and pH 7.2

<Production Medium>

10% glucose, 0.2% yeast extract, 1.6% ammonium sulfate, 0.1% potassium phosphate, 0.1% magnesium sulfate heptahydrate, 10 mg/L ferrous sulfate heptahydrate, 10 mg/L manganese sulfate monohydrate, 200 µg/L biotin, and pH 7.2.

After culturing was completed, concentrations of L-isoleucine and L-threonine in the culture solution were measured using high-performance liquid chromatography (HPLC), and the results are shown in Table 3 below.

TABLE 3

| Strain | L-Isoleucine concentration (g/L) | L-Threonine concentration (g/L) |
|---|---|---|
| ATCC13032 hom(R407H)/ pECCG117-ilvA(F383A) (parent strain) | 2.5 | 1.5 |
| CJILE-301 (strain) | 4.3 | 0.0 |

As shown in Table 1, although the parent strain, *Corynebacterium glutamicum* ATCC13032 hom(R407H)/ pECCG117-ilvA(F383A), produced L-isoleucine at a concentration of 2.5 g/L, the *Corynebacterium glutamicum* CJILE-301 strain, a variant according to the present disclosure, produced L-isoleucine at a concentration of 4.3 g/L, indicating that L-isoleucine productivity of the CJILE-301 strain increased compared to that of the parent strain by about 172%. In addition, the concentration of residual L-threonine decreased from 1.5 g/L to 0.0 g/L, indicating an increase in the activity of ilvA to threonine.

As a result of sequencing the ilvA gene by isolating the plasmid from the CJILE-301 strain, it was confirmed that A, the $1141^{st}$ base of the base sequence of the ilvA gene, was substituted with G, and thus a protein variant in which T of the $381^{st}$ position of the ilvA protein is substituted with A in addition to variation in which F of the $383^{rd}$ position is substituted with A may be encoded thereby, and may be expressed as SEQ ID NO: 22.

This result indicates that the strain introduced with the ilvA variant (T381A) of Example 2 obtained by random mutation may produce L-isoleucine with high efficiency and high yield.

Example 5: Preparation of Strain Introduced with ilvA(T381A) and ilvA(T381A AND F383A) Variants with L-Threonine Dehydratase Activity Primers of SEQ ID NOS: 31 and 32 for introduction of the ilvA variant (T381A and F383A) confirmed in Example 4 into the wild-type strain were prepared.

For preparation of the strain introduced with the ilvA variant (T381A and F383A), PCR was performed using the plasmid DNA extracted from the CJILE-301 strain of Example 4 as a template and primers of SEQ ID NOS: 31 and 32. Sequences of the primers used herein are listed in Table 4 below.

TABLE 4

| SEQ ID NO: | Name | Sequence |
|---|---|---|
| 31 | primer 9 | TCGAGCTCGGTACCCATGAGTGAAACATACGTGTC |
| 32 | primer 10 | CTCTAGAGGATCCCCCGTCACCGACACCTCCACA |

As a polymerase for PCR, a PfuUltra™ high-reliability DNA polymerase (Stratagene) was used, and the PCR conditions included denaturation at 95° C. for 30 seconds, annealing at 55° C. for 30 seconds, and 28 repetitions of polymerization at 72° C. for 2 minutes.

As a result, gene fragments of 1411 bp including a terminator region of about 100 bp of the ilvA gene of 1311 bp were obtained.

The amplified product was purified using a PCR purification kit and used as a DNA fragment to be inserted for preparation of a vector. After the purified amplification product was treated with smaI restriction enzyme, the pDZ vector heat-treated at 65° C. for 20 minutes and the DNA fragment for insertion, as the amplification product, were mixed in a molar ratio (M) of 1:2 and cloned using the infusion cloning kit in accordance with provided manuals to prepare a pDZ-T381A F383A vector for introduction of T381A and F383A mutations into the chromosome.

Corynebacterium glutamicum ATCC13032 hom(R407H) was transformed with the prepared vector by electroporation and subjected to a second crossover process to obtain a strain including ilvA(T381A and F383A) mutation on the chromosome, and the strain was named CA10-3101.

The CA10-3101 strain was deposited under the Budapest Treaty to the Korean Culture Center of Microorganisms (KCCM) on May 27, 2020, with Accession No. KCCM12739P.

In addition, in order to identify isoleucine producing capability and threonine degrading effects of the ilvA (T381A) variant with single mutation, primers of SEQ ID NOS: 47 and 48 were prepared.

In order to prepare a strain introduced with the ilvA variant (T381A), PCR was performed using the genomic DNA of Cgl13032 as a template and primers of SEQ ID NOS: 31 and 48 and SEQ ID NOS: 32 and 47. In this regard, sequences of the primers used herein are as shown in Table 5 below.

TABLE 5

| SEQ ID NO: | Name | Sequence |
|---|---|---|
| 47 | primer 47 | CCGGATGATGACATCgctCTGTTTGAGTACCTC |
| 48 | primer 48 | TCAAACAGagcGATGTCATCATCCGG |

As a polymerase for PCR, a PfuUltra™ high-reliability DNA polymerase (Stratagene) was used, and the PCR conditions included denaturation at 95° C. for 30 seconds, annealing at 55° C. for 30 seconds, and 28 repetitions of polymerization at 72° C. for 2 minutes.

As a result, gene fragments of 301 bp including a terminator region of about 100 bp of the ilvA gene of 1311 bp were obtained.

PCR was performed using the two amplified DNA fragments as templates and primers of SEQ ID NOS: 31 and 32. The PCR was performed under the following conditions. After denaturation at 95° C. for 10 minutes, cycles of denaturation at 95° C. for 30 seconds, annealing at 55° C. for 30 seconds, and polymerization at 72° C. for 2 minutes were repeated 30 times, and then polymerization was performed at 72° C. for 10 minutes.

As a result, A 1411 bp gene fragment including a 1311 bp ilvA gene and a 100 bp terminator site was obtained.

The amplified product was purified using a PCR purification kit and used as a DNA fragment to be inserted for preparation of a vector. After the purified amplification product was treated with smaI restriction enzyme, the pDZ vector heat-treated at 65° C. for 20 minutes and the DNA fragment for insertion, as the amplification product, were mixed in a molar ratio (M) of 1:2 and cloned using the infusion cloning kit in accordance with provided manuals to prepare a pDZ-T381A vector for introduction of T381A mutation into the chromosome.

Corynebacterium glutamicum ATCC13032 hom(R407H) was transformed with the prepared vector by electroporation and subjected to a second crossover process to obtain a strain including ilvA(T381A) mutation on the chromosome, and the strain was named ATCC13032 hom(R407H) ilvA (T381A).

The strain was inoculated onto a 250 mL corner-baffle flask containing 25 mL of an isoleucine production medium and cultured at 32° C. for 60 hours while shaking at 200 rpm to prepare L-isoleucine. A composition of a production medium used herein is described below.

<Production Medium>

10% glucose, 0.2% yeast extract, 1.6% ammonium sulfate, 0.1% monopotassium phosphate, 0.1% magnesium sulfate heptahydrate, 10 mg/L ferrous sulfate heptahydrate, 10 mg/L manganese sulfate monohydrate, 200 µg/L biotin, and pH 7.2.

After culturing was completed, concentrations of L-isoleucine and L-threonine in the culture solution were measured using high-performance liquid chromatography (HPLC), and the results are shown in Table 6 below.

TABLE 6

| Strain | L-Isoleucine (g/L) | L-Threonine (g/L) |
|---|---|---|
| ATCC13032 hom(R407H) | 0.0 | 3.8 |
| ATCC13032 hom(R407H) ilvA(WT) | 0.0 | 3.7 |
| ATCC13032 hom(R407H) ilvA(T381A) | 0.5 | 3.3 |
| CAW-3101 (ATCC13032 hom(R407H) ilvA(T381A and F383A)) | 3.3 | 0.0 |

As shown in Table 6, although the parent strain, Corynebacterium glutamicum ATCC13032 hom(R407H), did not produce L-isoleucine, the ATCC13032 hom(R407H) ilvA (T381A) variant with single mutation produced L-isoleucine at a concentration of 0.5 g/L with a decreased amount of L-threonine, and thus it was confirmed that productivity of L-isoleucine was increased compared with the parent strain. Also, the ATCC13032 hom(R407H) ilvA(T381A and F383A) variant further including F383A mutation produced L-isoleucine at a concentration of 3.9 g/L, and thus it was confirmed that productivity of L-isoleucine considerably increased compared to the parent strain.

Example 6: Preparation of ilvA Variant Vector with L-Threonine Dehydratase Activity Variants in which the amino acid at the ilvA mutation position with a high L-isoleucine productivity discovered in Example 1 above was substituted with different amino acids and effects thereof were identified. Specifically, 7 types of variants in which the amino acid at the $381^{st}$ position of ilvA was substituted with different amino acids were prepared using the plasmid prepared in Example 3 as a template. The variants, substituted amino acids, and sequences of primers used in respective variants are shown in Table 7 below.

TABLE 7

| Gene | Substituted amino acid | Primer SEQ ID NO: |
|---|---|---|
| ilvA | T381S | SEQ ID NO: 3, 33/SEQ ID NO: 34, 4 |
|  | T381P | SEQ ID NO: 3, 35/SEQ ID NO: 36, 4 |
|  | T381Q | SEQ ID NO: 3, 37/SEQ ID NO: 38, 4 |
|  | T381V | SEQ ID NO: 3, 39/SEQ ID NO: 40, 4 |
|  | T381I | SEQ ID NO: 3, 41/SEQ ID NO: 42, 4 |
|  | T381G | SEQ ID NO: 3, 43/SEQ ID NO: 44, 4 |
|  | T381M | SEQ ID NO: 3, 45/SEQ ID NO: 46, 4 |

Sequences of the primers used in Table 7 are as shown in Table 8 below.

TABLE 8

| SEQ ID NO: | Name | Sequence |
| --- | --- | --- |
| 33 | primer 15 | AGGTACTCtgcCAGggaGATGTCAT |
| 34 | primer 16 | ATGACATCtccCTGgcaGAGTACCT |
| 35 | primer 21 | AGGTACTCtgcCAGtggGATGTCAT |
| 36 | primer 22 | ATGACATCccaCTGgcaGAGTACCT |
| 37 | primer 27 | AGGTACTCtgcCAGctgGATGTCAT |
| 38 | primer 28 | ATGACATCcagCTGgcaGAGTACCT |
| 39 | primer 33 | AGGTACTCtgcCAGaacGATGTCAT |
| 40 | primer 34 | ATGACATCgttCTGgcaGAGTACCT |
| 41 | primer 35 | AGGTACTCtgcCAGgatGATGTCAT |
| 42 | primer 36 | ATGACATCatcCTGgcaGAGTACCT |
| 43 | primer 41 | AGGTACTCtgcCAGgccGATGTCAT |
| 44 | primer 42 | ATGACATCggcCTGgcaGAGTACCT |
| 45 | primer 45 | AGGTACTCtgcCAGcatGATGTCAT |
| 46 | primer 46 | ATGACATCatgCTGgcaGAGTACCT |

PCR was performed using the primers listed in Tables 7 and 8. Solg™ Pfu-X DNA polymerase (SolGent Co., Ltd.) was used as a polymerase, and the PCR was performed under the following conditions. After denaturation at 95° C. for 10 minutes, cycles of denaturation at 95° C. for 30 seconds, annealing at 55° C. for 30 seconds, and polymerization at 72° C. for 90 seconds were repeated 30 times, and then polymerization was performed at 72° C. for 5 minutes.

As a result, a DNA fragment of a 1457 bp 5' upstream region and a DNA fragment of a 279 bp 3' downstream region with respect to the mutation of the ilvA gene were obtained.

PCR was performed using the two amplified DNA fragments as templates and primers of SEQ ID NOS: 11 and 12. The PCR was performed under the following conditions. After denaturation at 95° C. for 10 minutes, cycles of denaturation at 95° C. for 30 seconds, annealing at 55° C. for 30 seconds, and polymerization at 72° C. for 2 minutes were repeated 30 times, and then polymerization was performed at 72° C. for 10 minutes.

As a result, DNA fragments of 1736 bp including mutation of the ilvA gene encoding threonine dehydratase variants in which threonine at the $381^{st}$ position was substituted with each of the amino acids of Table 3 were amplified. The pECCG117 vector and the ilvA DNA fragment of 1736 bp obtained via PCR were treated with BamHI restriction enzyme and ligated with a DNA ligase, followed by cloning to obtain a plasmid. Thus, 7 types of the ilvA variant vectors in which threonine at the $381^{st}$ position was substituted with each of the amino acids shown in Table 3 named as listed in Table 9 below.

TABLE 9

| Gene | Substituted amino acid | Name of ilvA variant vector |
| --- | --- | --- |
| ilvA | T381S | pECCG117-ilvA(T381S, F383A) |
|  | T381P | pECCG117-ilvA(T381P, F383A) |
|  | T381Q | pECCG117-ilvA(T381Q, F383A) |
|  | T381V | pECCG117-ilvA(T381V, F383A) |
|  | T381I | pECCG117-ilvA(T381I, F383A) |
|  | T381G | pECCG117-ilvA(T381G, F383A) |
|  | T381M | pECCG117-ilvA(T381M, F383A) |

Example 7: Evaluation of L-Isoleucine Producing Capability of Strain Introduced with ilvA Variant Having L-Threonine Dehydratase Activity A *Corynebacterium glutamicum* ATCC13032-derived lysC gene encoding aspartokinase was introduced with mutation (L377K) for enhancement of expression of the lysC gene and relief of feedback inhibition by L-lysine and L-threonine (U.S. Pat. No. 10,662,450 B2). In order to prepare a vector including the mutant lysC gene, a pair of primers for amplifying a 5' upstream region (SEQ ID NOS: 50 and 51) and a pair of primers for amplifying a 3' downstream region (SEQ ID NOS: 52 and 53) with respect to the mutation position were designed. XbaI and SalI restriction enzymes were inserted to both ends of the primers of SEQ ID NOS: 50 and 53, and the primers of SEQ ID NOS: 51 and 52 were designed to cross each other, and nucleotide substitution was located at this region. Sequences of the primers are as shown in Table 10 below.

TABLE 10

| SEQ ID NO: | Name | Sequence |
| --- | --- | --- |
| SEQ ID NO: 50 | lysC_L377K_ 5 F | tcctctagaGCTGCGCAGTGTTGAATACG |
| SEQ ID NO: 51 | lysC_L377K_ 5 R | AGGTGGAAATCTTTTCGATGTTC |
| SEQ ID NO: 52 | lysC_L377K_ 3 F | GAACATCGAAAAGATTTCCACCT |
| SEQ ID NO: 53 | lysC_L377K_ 3 R | gactctagaGTTCACCTCAGAGACGATTA |

PCR was performed using the chromosome of *Corynebacterium glutamicum* ATCC13032 as a template and primers of SEQ ID NOS: 50 and 51 and SEQ ID NOS: 52 and 53. The PCR was performed under the following conditions. After denaturation at 95° C. for 5 minutes, cycles of denaturation at 95° C. for 30 seconds, annealing at 55° C. for 30 seconds, and polymerization at 72° C. for 30 seconds were repeated 30 times, and then polymerization was performed at 72° C. for 7 minutes.

As a result, a DNA fragment of a 512 bp 5' upstream region and a DNA fragment of a 522 bp 3' downstream region with respect to the mutation of the lysC gene were obtained.

PCR was performed using the two amplified DNA fragments as templates and primers of SEQ ID NOS: 50 and 53. The PCR was performed under the following conditions. After denaturation at 95° C. for 5 minutes, cycles of denaturation at 95° C. for 30 seconds, annealing at 55° C. for 30 seconds, and polymerization at 72° C. for 60 seconds were repeated 30 times, and then polymerization was performed at 72° C. for 7 minutes.

As a result, a DNA fragment of 1011 bp including the mutant lysC(L377K) gene (SEQ ID NO: 49) encoding an aspartokinase variant in which leucine at the 377th position was substituted with lysine was amplified.

The lysC(L377K) fragment obtained by the PCR was treated with XbaI and SalI restriction enzymes at both ends and ligated to a pDZ vector (KR 2008-0025355) treated with the XbaI and SalI restriction enzymes, followed by cloning to finally obtain a pDZ-lysC(L377K) recombinant vector cloned with a lysC(L377K) substitution cassette.

The ATCC13032 hom(R407H) strain of Example 3 was transformed with the prepared pDZ-lysC(L377K) vector using an electric pulse method and subjected to a second crossover process to obtain *Corynebacterium* ATCC13032 hom(R407H) lysC(L377K) introduced with the lysC gene on the chromosome. The mutant gene was finally identified by PCR performed using the primers of SEQ ID NOS: 50 and 53 and then comparing the sequence with that of the wild-type lysC gene by sequencing.

Thereafter, the 7 types of ilvA variant vectors prepared in Example 6 and pECCG117-ilvA(T381A and F383A) extracted from the CJILE-301 strain of Example 4 were introduced into the prepared *Corynebacterium glutamicum* ATCC13032 hom(R407H) lysC(L377K) strain using an electric pulse method and smeared on a selective medium containing 25 mg/L kanamycin to obtain transformed strains. Thereafter, concentrations of L-isoleucine and L-threonine were measured in the same manner as in Example 4, and the results are shown in Table 11 below.

TABLE 11

| Strain | L-Isoleucine (g/L) | L-Threonine (g/L) |
| --- | --- | --- |
| ATCC13032 hom(R407H) lysC(L377K) | 0.0 | 3.5 |
| ATCC13032 hom(R407H) lysC(L377K)/pECCG117-ilvA(F383A) | 2.3 | 1.5 |
| ATCC13032 hom(R407H) lysC(L377K)/pECCG117-ilvA(T381A and F383A) | 4.3 | 0.0 |
| ATCC13032 hom(R407H) lysC(L377K)/pECCG117-ilvA(T381S, F383A) | 2.7 | 1.1 |
| ATCC13032 hom(R407H) lysC(L377K)/pECCG117-ilvA(T381P, F383A) | 2.9 | 1.4 |
| ATCC13032 hom(R407H) lysC(L377K)/pECCG117-ilvA(T381Q, F383A) | 2.6 | 1.3 |
| ATCC13032 hom(R407H) lysC(L377K)/pECCG117-ilvA(T381V, F383A) | 3.0 | 0.7 |
| ATCC13032 hom(R407H) lysC(L377K)/pECCG117-ilvA(T381I, F383A) | 3.8 | 0.2 |
| ATCC13032 hom(R407H) lysC(L377K)/pECCG117-ilvA(T381G, F383A) | 3.2 | 0.5 |
| ATCC13032 hom(R407H) lysC(L377K)/pECCG117-ilvA(T381M, F383A) | 2.5 | 1.2 |

As shown in Table 11 above, it was confirmed that the T381A, T381S, T381P, T381Q, T381V, T381I, T381G, and T381M variants of ilvA had higher threonine degradation rates and enhanced L-isoleucine producing capability.

Example 8: Evaluation of L-Isoleucine Producing Capability of ilvA Variant Having Threonine Dehydratase Activity in L-Isoleucine-Producing Strain The ilvA mutation (T381A and F383A) exhibiting the most increased L-isoleucine producing capability in Example 7 was introduced into an L-isoleucine-producing KCJI-38 strain (KCCM11248P, Korean Patent No. 10-1335789) treated with N-methyl-N'-nitro-N-nitrosoguanidine (NTG) using an electric pulse method and smeared on a selective medium containing 25 mg/L kanamycin to obtain transformed strains. Thereafter, concentrations of L-isoleucine and L-threonine were measured in the same manner as in Example 4, and the results are shown in Table 12 below.

TABLE 12

| Strain | L-Isoleucine (g/L) | L-Threonine (g/L) |
| --- | --- | --- |
| KCCM11248P | 1.5 | 0.5 |
| KCCM11248P/pECCG117-ilvA(F383A) | 2.8 | 0.6 |
| KCCM11248P/pECCG117-ilvA(T381A and F383A) | 4.0 | 0.0 |

As shown in Table 12 above, it was confirmed that the KCCM11248P/pECCG117-ilvA(T381A and F383A) strain introduced with the ilvA mutation (F381T and F383A) had significantly increased L-isoleucine productivity and a higher L-threonine degradation rate compared to the KCCM11248P strain or the KCCM11248P/pECCG117-ilvA (F383A) strain.

The above-described results indicate that the ilvA variant according to the present disclosure may increase production of L-isoleucine. In addition, the variation at the 381$^{st}$ position of the ilvA gene is confirmed as a variation assisting binding for degradation of L-threonine, and thus the variation was confirmed to have a role in an increase in production of L-isoleucine.

The above description of the present disclosure is provided for the purpose of illustration, and it would be understood by those skilled in the art that various changes and modifications may be made without changing the technical conception and essential features of the present disclosure. Thus, it is clear that the above-described embodiments are illustrative in all aspects and do not limit the present disclosure. The various embodiments disclosed herein are not intended to be limiting, with the true scope and spirit being indicated by the following claims. The present disclosure is to be limited only by the terms of the appended claims, along with the full scope of equivalents to which such claims are entitled.

The invention claimed is:

1. An L-threonine dehydratase variant in which an amino acid corresponding to the 381st position of an amino acid sequence of SEQ ID NO: 1 is substituted with a different amino acid,
wherein the L-threonine dehydratase variant comprises a sequence having at least 96% identity with the amino acid sequence of SEQ ID NO:1, and
wherein the different amino acid is selected from the group consisting of: alanine, serine, proline, glutamine, valine, isoleucine, and glycine.

2. The variant of claim 1, wherein the variant comprises one amino acid sequence selected from the group consisting of amino acid sequences of SEQ ID NOS: 4 to 9.

3. The variant of claim 1, wherein the variant is one in which an amino acid corresponding to the 383$^{rd}$ position of the amino acid sequence of SEQ ID NO: 1 is further substituted with alanine.

4. The variant of claim 3, wherein the variant comprises one amino acid sequence selected from the group consisting of amino acid sequences of SEQ ID NOS: 24-29.

5. A polynucleotide encoding the L-threonine dehydratase variant according to claim 1.

6. A microorganism comprising at least one of: the L-threonine dehydratase variant according to claim 1; a polynucleotide encoding the variant; and a vector including the polynucleotide.

7. The microorganism of claim 6, wherein the microorganism has L-isoleucine producing capability.

8. The microorganism of claim 6, wherein the microorganism belongs to the genus *Corynebacterium*.

9. The microorganism of claim 6, wherein the microorganism is *Corynebacterium glutamicum*.

10. A method of producing L-isoleucine, the method comprising: culturing a microorganism comprising at least one of: the L-threonine dehydratase variant according to claim 1, a polynucleotide encoding the variant, and a vector including the polynucleotide; in a culture medium.

11. The method of claim 10, further comprising recovering L-isoleucine from the culture medium or the microorganism.

12. A composition for producing L-isoleucine comprising a microorganism comprising at least one of: the L-threonine dehydratase variant according to claim 1, a polynucleotide encoding the variant, and a vector including the polynucleotide; or cultures of the microorganism.

13. The variant of claim 1, wherein the L-threonine dehydratase variant comprises a sequence having at least 98% identity with the amino acid sequence of SEQ ID NO: 1.

14. The variant of claim 1, wherein the L-threonine dehydratase variant comprises a sequence having at least 99% identity with the amino acid sequence of SEQ ID NO: 1.

15. The variant of claim 1, wherein the different amino acid is alanine.

16. The variant of claim 1, wherein the variant comprises the amino acid sequence of SEQ ID NO: 3.

17. The variant of claim 3, wherein the variant comprises the amino acid sequence of SEQ ID NO: 23.

\* \* \* \* \*